United States Patent [19]

Attallah

[11] Patent Number: 5,119,412
[45] Date of Patent: Jun. 2, 1992

[54] METHOD AND A SYSTEM FOR REMOTELY SWITCHING AND/OR REGULATING AND MONITORING AND ELECTRICALLY OPERATED DEVICE OR AN ENVIRONMENT BY THE USE OF SIGNALS GENERATED BY A TELEPHONE OR A MODEM

[76] Inventor: Arnaldo Attallah, 831 boulevard St-Germain, St-Germain, Ville St-Laurent, Quebec, Canada, H4L 3R7

[21] Appl. No.: 563,989

[22] Filed: Aug. 6, 1990

[51] Int. Cl.⁵ ............................................ H04M 11/00
[52] U.S. Cl. .................................. 379/102; 379/104; 379/97
[58] Field of Search ................. 379/102, 104, 96, 97, 379/94, 98, 93

[56] References Cited

U.S. PATENT DOCUMENTS

| | | | |
|---|---|---|---|
| 4,353,502 | 10/1982 | Myers | 379/104 |
| 4,578,540 | 3/1986 | Borg et al. | 379/102 |
| 4,665,544 | 5/1987 | Honda et al. | 379/102 |
| 4,748,654 | 5/1988 | Gray | 379/104 |
| 4,788,714 | 11/1988 | Hashimoto | 379/102 |
| 4,791,658 | 12/1988 | Simon et al. | 379/104 |
| 4,845,773 | 7/1989 | Attallah | 379/102 |

Primary Examiner—James L. Dwyer
Assistant Examiner—Stella L. Woo

[57] ABSTRACT

A switching system and method of remote switching and/or regulating an electrically operated device by the use of the DTMF telephone or modem signals. A switching and/or regulating element is actuated and/or controlled by the system upon detecting a specific code generated remotely by telephone or modem. The system allows to remotely monitor environmental sounds, the status of the device and/or the variables controlled by this device by the use of signals generated by the system. The system also allows a bi-directional communication by transmiting sounds or spelling words, spelling data and sentences generated by a voice synthesizer for monitoring outside the premises by the use of a telephone for human understanding. The system may use unlimited types of messages which can also describe the status of any type of physical variable sensed on the premises and/or transmits modulated data of the messages described above for out of the premises computer communication linked by the telephone network via a modem. The system also provides for auto-dialing telephone numbers to reach a human and/or computers after detecting external elements malfunctioning.

18 Claims, 19 Drawing Sheets

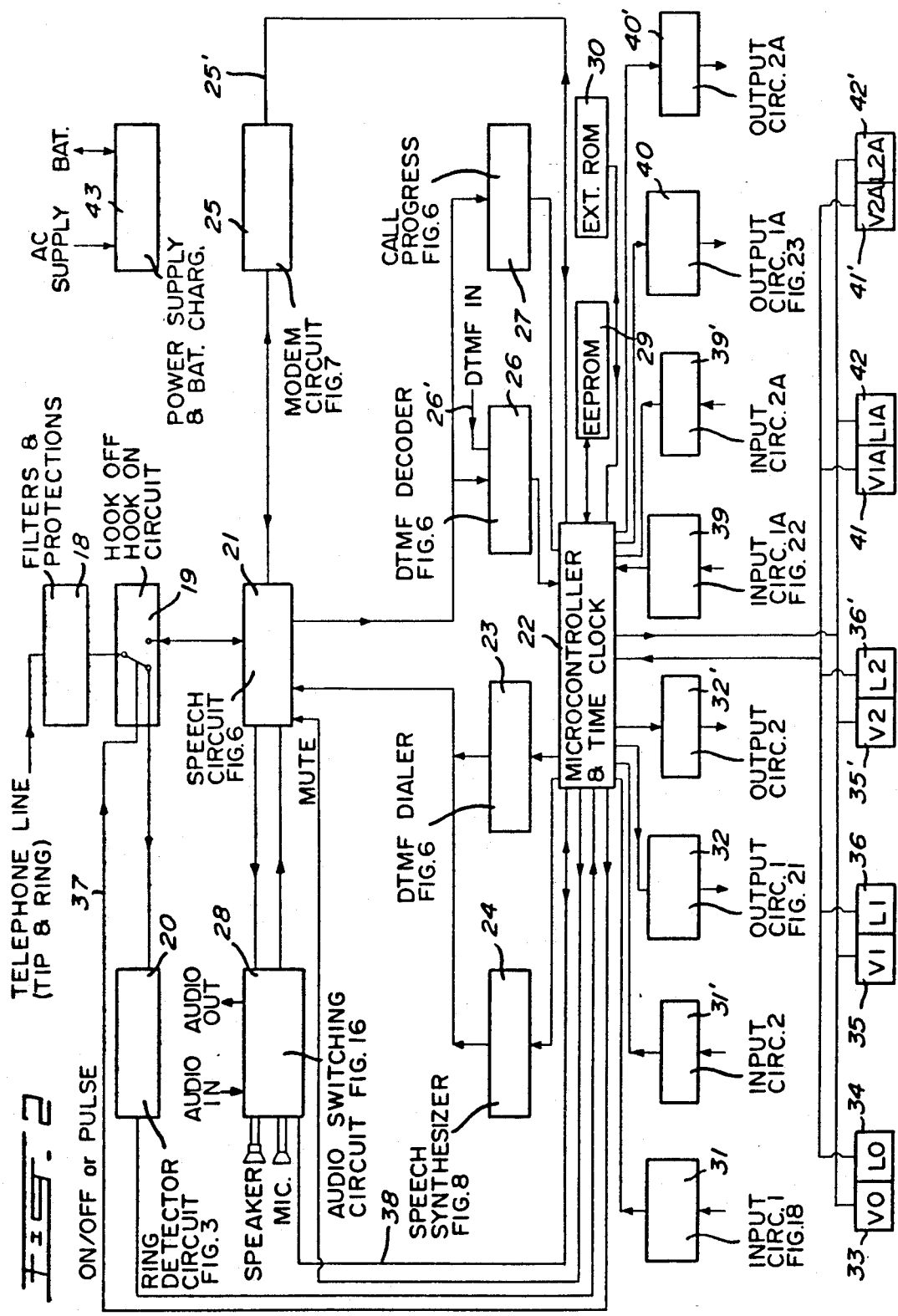

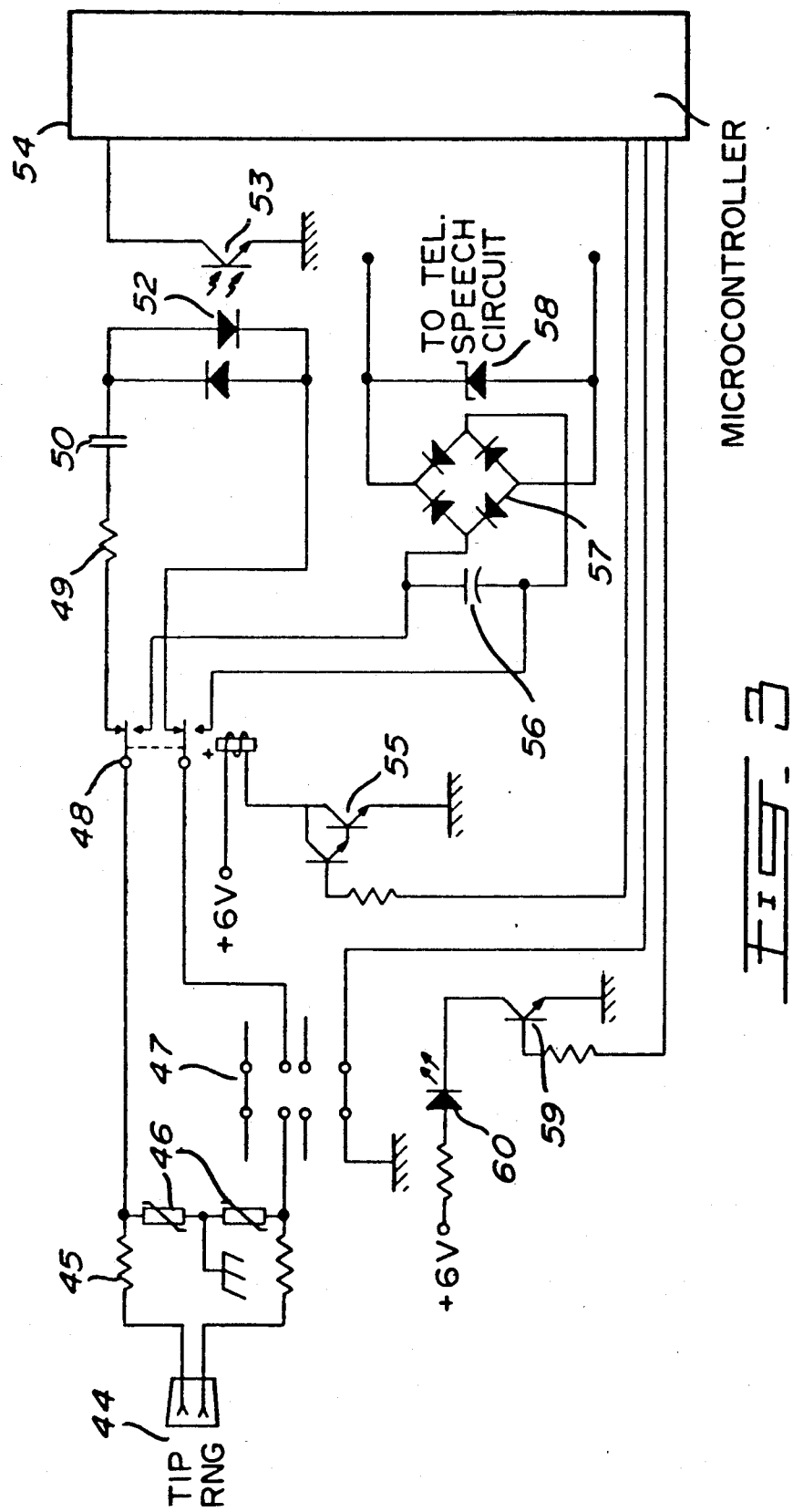

METHOD OF ANALYSING CALLING RINGS
AND REJECTING UNDESIRABLE SIGNALS

```
┌─────────────────────────────────────────┐
│ START PROCESS ANALYSIS AT THE FIRST     │
│      SLOPE OF ANY TYPE OF PULSE         │
└─────────────────────────────────────────┘
                     │
                     ▼
┌─────────────────────────────────────────────────┐
│ TEST IF THE ENVELOPE OF THE SERIES OF PULSES    │
│ SORRESPONDS TO THE CALLING PERIOD CONSTANT PATERN│
│ PROGRAMMED IN THE SYSTEM, PLUS OR MINUS AN ERROR │
│  DELTA, AND IF THE PERIODS OF SUCH PULSES (TCP)  │
│    OR OTHERS WITHIN THE CALLING PERIOD CONSTANT  │
│   REFERENCE PATERN ARE SIMILAR, THEN VALIDATE THE│
│     CALLING SIGNALS AS A RING; IF NOT, REJECT THE│
│   CALLING SIGNAL AND DO NOT VALIDATE IT AS A RING.│
└─────────────────────────────────────────────────┘
```

FIG. 5

METHOD OF FILTERING DIGITALLY
THE A.C. SUPERVISION SIGNALS
FROM 10 Hz UP

```
┌─────────────────────────────────────────┐
│ START PROCESS ANALYSIS OF THE INPUT     │
│        SUPERVISION CHANNELS             │
└─────────────────────────────────────────┘
                     │
                     ▼                          187
┌─────────────────────────────────────────────────┐
│ TEST IF INPUT STATE OF A CHANNEL STAY LOW        │
│   FOR MORE THEN 100 ms; IF TRUE, CONSIDER        │
│      THE SUPERVISION FEEBACK 'OFF';              │
│      IF NOT TRUE, CONSIDER IT 'ON'.              │
└─────────────────────────────────────────────────┘
```

FIG. 18

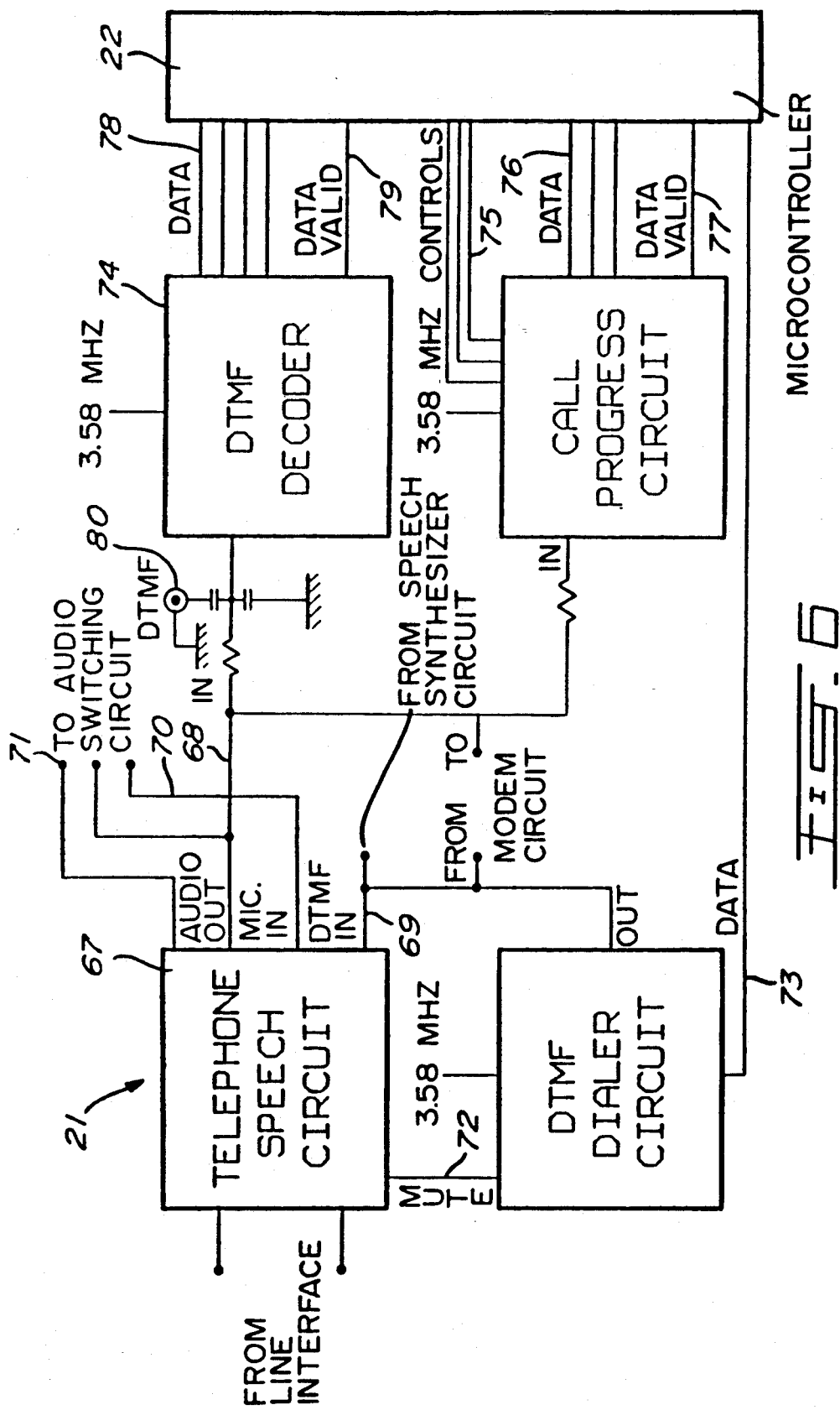

PROGRAMMING CODES USING DTMF

OPTION NUMBER

103 — PERSONAL ACCESS CODE  |1|1|1|1|

104 — HIGH LEVEL SECURITY PROGRAMMING MASTER CODE  |0|0|0|0|0|0|0|

105 — DEVICE IDENTIFICATION TRANSMISSION CODE  |0|0|1|  WHEN 0 IS 1 OR 2 RINGS, THEN RE-CALL IN 60 SECONDS AND ANSWERS FIRST RING OF SECOND CALL

106 — NUMBER OF RINGS FOR DEVICE ANSWERING  |5|

107 — VOICE SYNTHESIZER LANGUAGE 0 = ENGLISH  |0|

108 — PULSE/TONE WHEN AUTO-DIALING 0 = PULSE, 1 = TONE  |0|

109 — FIRST TEL. NUMBER TO DIAL PREFIX 0 = DIAL FOR A HUMAN PREFIX 1 = DIAL FOR A MODEM  |0|5|5|5|5|5|5|1|1|1|1|

110 — SEC. TEL. NUMBER TO DIAL PREFIX 0 = DIAL FOR A HUMAN PREFIX 1 = DIAL FOR A MODEM  |0|5|5|5|5|5|5|1|1|1|1|

110' — NUMBER OF TIMES TO REDIAL WHEN AUTO DIALING  |3|

110" — REDIAL AFTER (IN MINUTES)  |1|0| MINUTES

FIG. 10A

| PROGRAMMING CODES USING DTMF ||
|---|---|
| OPTION NUMBER | |
| 111 — APPLICATION MODE<br>01 TO 99 | `0` `1` |
| 112 — OUTPUT CONTACTS ARRANGEMENT<br>0 = NORMALLY OPEN<br>1 = NORMALLY CLOSED | `0` `0` |
| 113 — AUTO-OFF FUNCTION<br>0 = AUTO-OFF DISABLED<br>1 = AUTO-OFF ENABLED<br>2 = EMERGENCY-OFF ENABLED | `0` `0'` |
| 114 — FEEDBACK WAITING DELAY<br>NON LINEAR SETTING<br>0 = 1 SEC. 1 = 10 SEC.<br>2 = 20 SEC. 9 = 2560 SEC. | `0` `0'` |
| 115 — AUTO-DIALING FUNCTION<br>0 = DISABLE AUTO-DIALING<br>1 = ENABLE AUTO-DIALING | `0` `0'` |
| 116 — REAL TIME CLOCK SETTING<br>DAY OF THE WK : HOUR : MIN<br>0 = SUNDAY ... 6 = SATURDAY | `0` `0` `0` `0` `0` |
| 117 — AUTOMATIC SWITCH ON/OFF TIMER C.C.1<br>Hr:Min (ON), Hr:Min (OFF) SETTINGS<br>LAST DIGIT = 0, 1, 2, 3<br>OFF (SUN&SAT, SUN, SAT, NONE) | `0` `0` `0` `0` `0` `0` `0` `0` `1` |
| — AUTOMATIC SWITCH ON/OFF TIMER C.C.2<br>Hr:Min (ON), Hr:Min (OFF) SETTINGS<br>LAST DIGIT = 0, 1, 2, 3<br>OFF (SUN&SAT, SUN, SAT, NONE) | `0'` `0'` `0'` `0'` `0'` `0'` `0'` `0'` `1'` |
| 118 — ENABLE TWO-WAY AUDIO =0<br>DISABLE SPEAKER ONLY =1<br>DISABLE MICROPHONE ONLY =2<br>DISABLE TWO-WAY AUDIO =3 | `0` `0` |
| 118'— AUTO DIALING FUNCTION<br>0=DISABLE AUTO-DIAL<br>1=ENABLE AUTO-DIAL | `0` `0` |

FIG. 10B

PROGRAMMING CODES USING DTMF

OPTION NUMBER

119 — TYPE OF READED UNIT
    00 = NO LISTED "READING"
    01 = TEMPERATURE
    45 = OTHER TYPE LISTED
| 0 | 0 | 0 | 0 |

120 — NAME OF THE UNIT
    00 = NO LISTED "UNITS"
    01 = DEGREE CELSIUS
    45 = OTHER NAME LISTED
| 0 | 0 | 0 | 0 |

121 — BOTTOM SCALE MAGNITUDE
0.00 TO 999
1st DIGIT (PLUS SIGN) = 0
1st DIGIT (MINUS SIGN) = 1
| 0 | 0 | 0 | 0 | 0 | 0 | 0 | 0 |

122 — TOP SCALE MAGNITUDE
0.00 TO 999
1st DIGIT (PLUS SIGN) = 0
1st DIGIT (MINUS SIGN) = 1
| 0 | 0 | 0 | 0 | 0 | 0 | 0 | 0 |

123 — CENTER WINDOW REF. FOR REGUL.
0.00 TO 999
1st DIGIT (PLUS SIGN) = 0
1st DIGIT (MINUS SIGN) = 1
| 0 | 0 | 0 | 0 | 0 | 0 | 0 | 0 |

124 — OUTPUT WINDOW DELTA REGUL.
    00 = NO REGULATION
    01 = MIN DELTA REGULATION
    99 = MAX DELTA REGULATION
| 0 | 0 | 0 | 0 |

125 — DECIMAL SCALE DIVIDER
0 = /1, 1 = /10, 2 = /100
| 0 | 0 |

126 — ANALOG AUTO-OFF SUPERVISION
0 = NO, 1 = YES
| 0 | 0 |

127 — READ & SPEECH MSG & REG. RATE
0 = 1 sec., ..., 9 = 10sec.
| 0 | 0 |

128 — ALLOW REFERENCE WINDOW SHIFT
UP/DOWN BY COMMAND
0 = NO, 1 = YES
| 0 | 0 |

128' — AUTO-DIALING FUNCTION
ENABLE-DISABLE
| 0 | 0 |

FIG. 10C

| MODE 1 | | MODE 2 | | MODE 3 | | MODE 4 | |
|---|---|---|---|---|---|---|---|
| CHANNEL # | CONTACT ACTION | CHANNEL # | CONTACT ACTION | CHANNEL # | CONTACT ACTION | CHANNEL # | CONTACT ACTION |
| 1 | CONTINUOUS | 1 | MOMENTARY | 1 | CONTINUOUS | 1 ⎤ | MOMENTARY |
| 2 | CONTINUOUS | 2 | MOMENTARY | 2 | MOMENTARY | 2 ⎦ | PAIR |

MOMENTARY PAIR
N.O. & N.C.
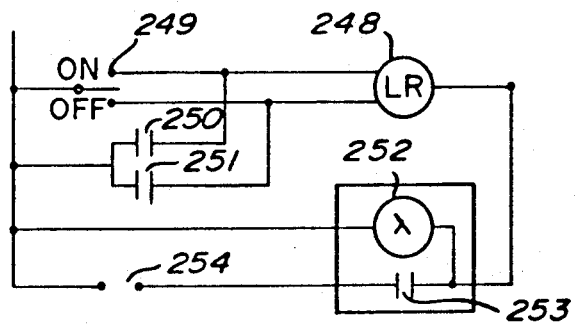
MOMENTARY PAIR
N.O. & N.C.
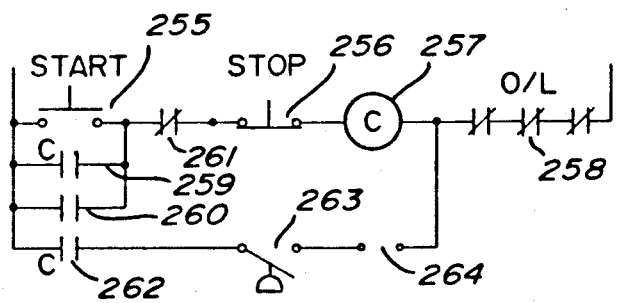
CONTINUOUS
N.O.
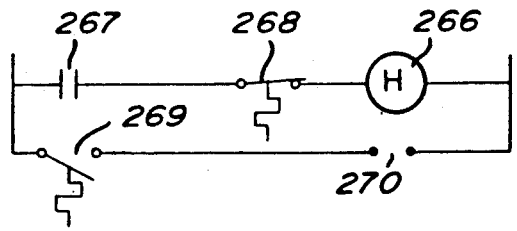
MOMENTARY
N.O.
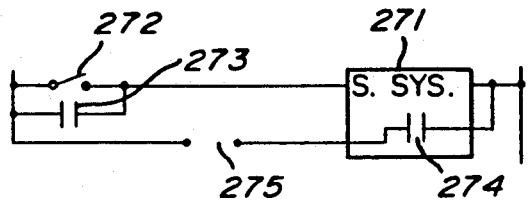
FIG. 10E

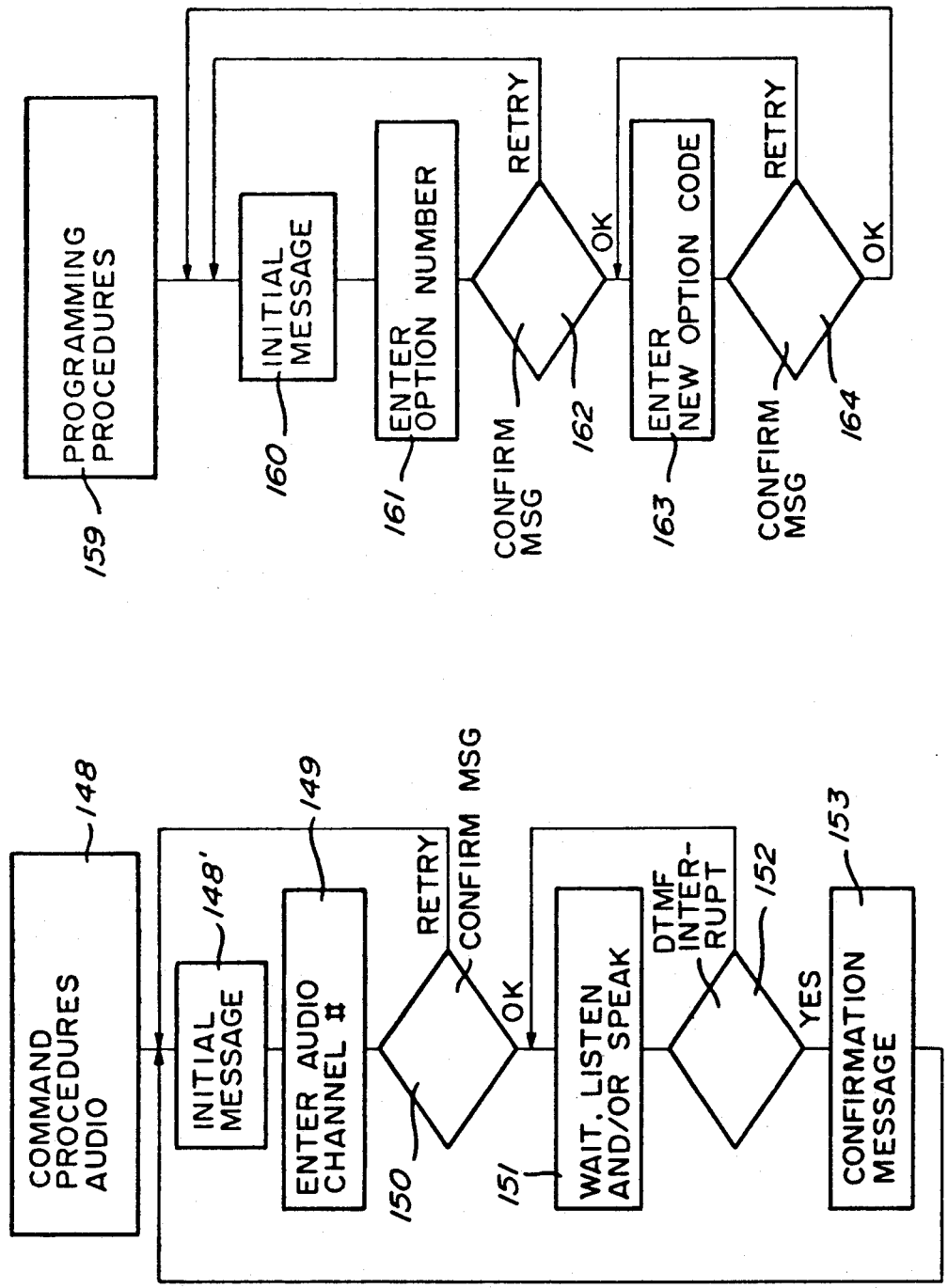

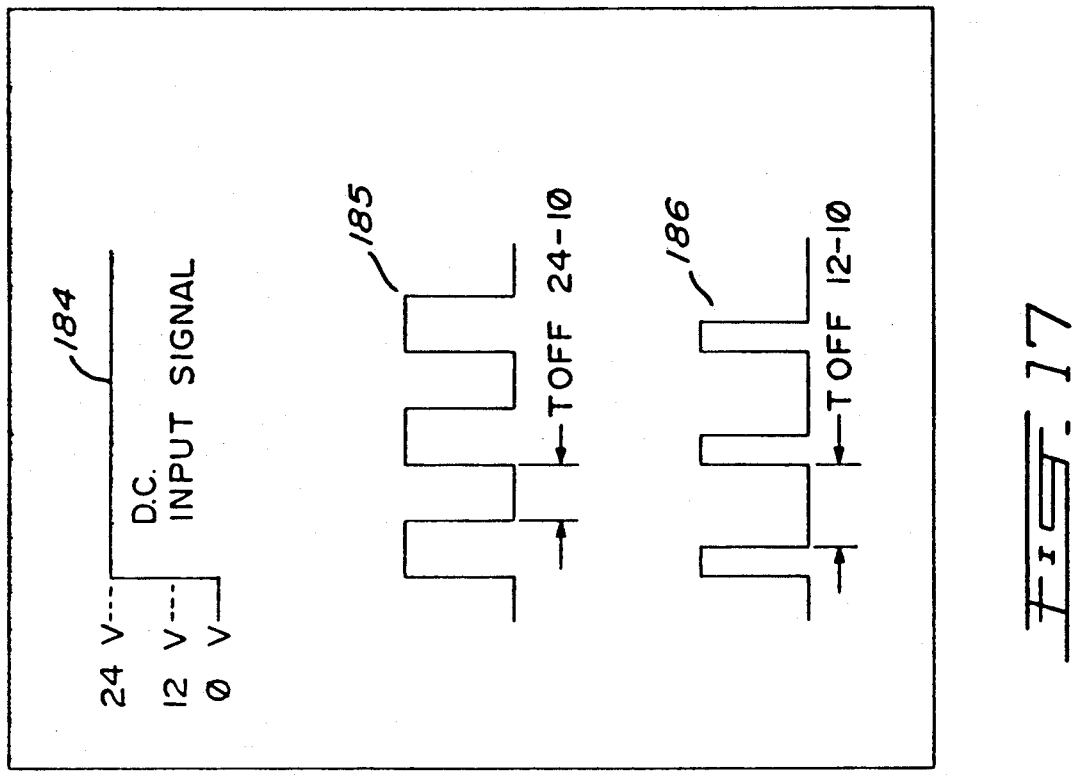
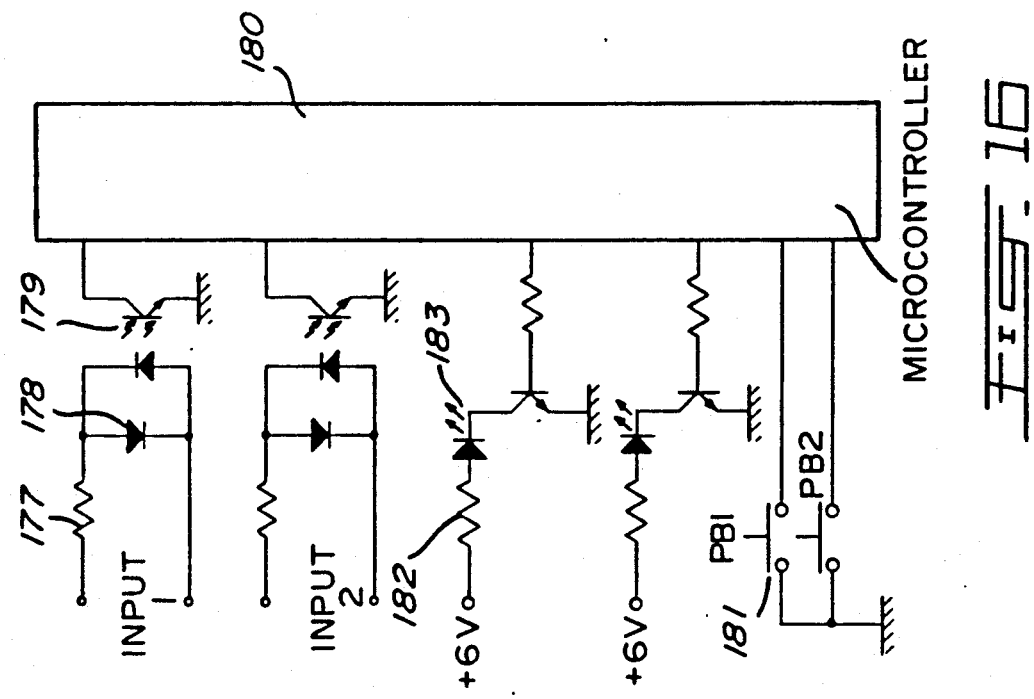

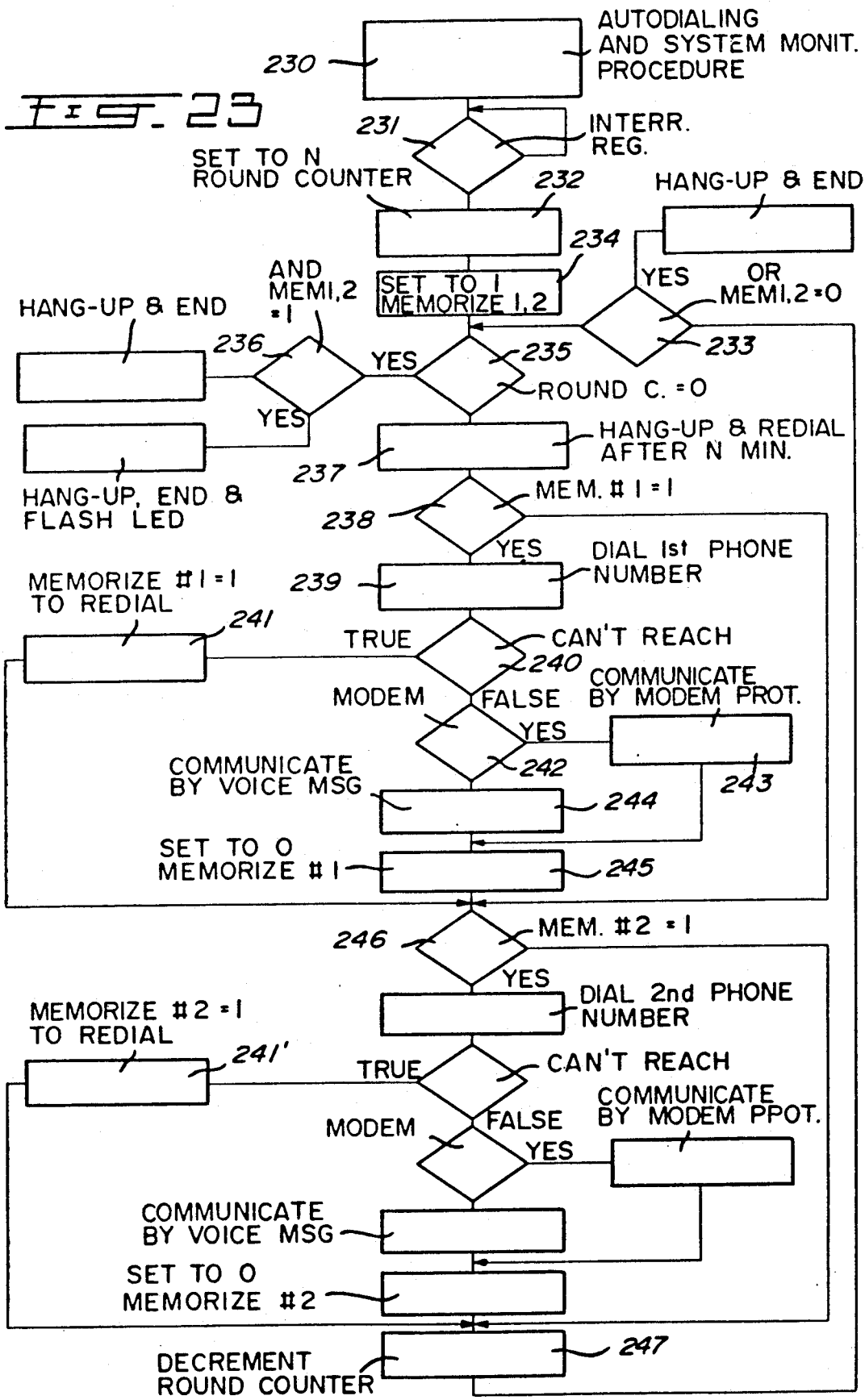

METHOD AND A SYSTEM FOR REMOTELY SWITCHING AND/OR REGULATING AND MONITORING AND ELECTRICALLY OPERATED DEVICE OR AN ENVIRONMENT BY THE USE OF SIGNALS GENERATED BY A TELEPHONE OR A MODEM

SUMMARY OF INVENTION

1. Field of the Invention

The present invention relates to an improved method and system for remotely switching, regulating and monitoring electrically operated devices by the use of signals generated by a telephone or modem.

2. Description of Prior Art

In my earlier U.S. Pat. No. 4,845,773 issued Jul. 4, 1989, I described a method and a system for remotely switching an electrically operated device, such as electrical baseboard heaters, by the use of signals generated by a telephone. In that particular system, I controlled remote switches by detecting a specific code of sound signals generated by the telephone. It was necessary to locate the switching system in close proximity to a telephone whereby to detect the ringing sound whereby the switching system could be actuated. With that particular system, I was more concerned with the control of various electrical devices such as heat pumps, motors, electric elements, contactors, etc. However, there is a need to provide an improved system in which it is not necessary to detect audible sound signals and which has an infinite number of applications and which is also programmable by the use of DTMF telephone signals or modem signals.

SUMMARY OF INVENTION

Accordingly, the improved system of the present invention is comprised of a common telephone input consisting of two wires which are to be connected to a standard telephone telecommunication network. A 12-volt or 24-volt power supply and a battery back-up provide the power to the system with inputs and outputs for three sub-systems. The first is an audio sub-system and consists of microphones which allows the system to listen to its environment. The outputs of this sub-system are loudspeakers which permit the user to communicate with the room on the other end of the line. This is similar to a "hands free" telephone receiver. The second sub-system is an "ON/OFF" switching sub-system whose input is the feedback line from the external switching element (sensor), and the outputs are dry contacts used to switch electrically operated devices on or off remotely by telephone. The third sub-system also consists of inputs and outputs and wherein the inputs represent analog variables (for example a pressure measurement), and the output is a command signal (for example to a motor or actuator), which incrementally changes the analog reference which is measured by the input.

The device allows the remote access to the three sub-systems through the use of a telephone or a computer and modem. For example, if the user wishes to speak to, or simply audit the activities in a conference room, auditorium, classroom, etc., he/she simply communicates with the system, accesses the audio sub-system and commands either the speak/listen or simply the listen mode of that system.

For the "ON/OFF" switching sub-system, the user employs a standard DTMF telephone keypad to switch on or off, or simply confirm the status of an externally switched electrically operated device.

For the third sub-system, the user remotely gains access to the system, again by telephone, and may control and/or monitor the status of an analog variable. A digitally synthesized voice will verbally convey the status of the variable. The user may also vary the predetermined setting of the reference for this variable by commanding an incremental change to it. The user will wait for and receive verbal feedback, via the digitally synthesized voice, of the status of the changing variable. This communication may also be performed by computer if the user implements the "Computer Communication" via a modem.

Therefore, this is a bidirectional system where the user may listen to a digitally synthesized message, or audit the conversation in a room, or may remotely switch on or off, or simply change the setting of an analog variable, all commanded simply with a DTMF telephone keypad.

This is a bidirectional system on the "incoming call" level. The system also has the capacity, via the "auto-dialer", to call and convey messages, however, the system is unidirectional in this mode as it is unable to receive commands. As an example of this mode, the "ON/OFF" switching sub-system can sense a malfunction in an electrically operated device, for example, caused by an open or closed pressure switch triggered by an abnormally high pressure buildup or loss. There is an interruption requested in the interior of the device which will then send an auto-dialing code in the system, which proceeds to dial one or more preprogrammed telephone numbers. A synthesized voice will communicate the breakdown to the person who answers the telephone call. This "auto-dialer" function may also be executed through a modem. The system dials the modem telephone number and sends the computer codes which identify the defective zone.

We can thereby conclude that this is a simple "STAND ALONE" system, which is not as complex as the current energy management systems used in large buildings or industrial security systems. The system of this invention easily connects with standard electrically operated devices thereby rendering it universally functional with an infinite number of possible applications, such as alimentary, agricultural, manufacturing, plastic, industrial, process control, government institutions and building management, to name a few. It is pointed out that the three sub-systems are not exclusively integrated in all system applications.

According to a broad aspect of the present invention, there is provided a stand-alone switching system for remotely controlling and monitoring electrically operated devices or monitoring locations by the use of DTMF code signals generated by a telephone keypad. The system comprises a telephone line input for connection to a telephone network. An input interface circuit is connected to the input and has an auto-dialer circuit. A communication circuit is connected between the interface circuit and a microcontroller. The microcontroller is connected to a switching sub-system for switching the electrically operated devices and/or to an audio circuit for monitoring an environment and/or an analog control and monitoring sub-system, all of which perform predetermined functions implemented by the user through the telephone keypad by using a programming or command access algorithm through a series of option codes punched on the keypad. The communication circuit operates in a DTMT or modulated signals mode depending on the source of the input signal codes.

According to a further broad aspect of the present invention, there is provided a method of effecting a remote function by the use of DTMF code signals generated by a telephone keypad and representative of a programming or a command access algorithm. The method comprises providing a stand-alone switching system. Depressing keys on the keypad to generate a personal access code signal to permit the system to connect itself to a telephone line generating the personal access code signal. The access code signal is analyzed by the system to determine if it is a human command or a modem command. The system automatically connects a communication circuit depending on the nature of the access code signal analyzed. A sub-system is accessed by an access code. The sub-system is comprised of a switching circuit for switching electrically operated devices, an audio circuit for monitoring an environment or an analog control and monitoring circuit for controlling and monitoring a remote process apparatus.

BRIEF DESCRIPTION OF DRAWINGS

A preferred embodiment of the present invention will now be described with reference to the example thereof as illustrated in the accompanying drawings in which:

FIG. 2 is a detailed block diagram showing the global interconnections between the different circuits used in the system of the present invention;

FIG. 3 is a schematic diagram of the telephone network interface with the system including the circuit of the ring detector;

FIG. 5 is an algorithm showing the procedures of the method to reject the undesirable signals illustrated in FIG. 4;

FIG. 6 is an interconnected block diagram of the integrated circuits used to process the incoming and outgoing telephone calls;

FIGS. 10A, 10B and 10C are illustrations showing the locations and codes to program the options of the system. The codes shown represent the factory preprogrammed codes;

FIG. 10E is a schematic ladder diagram showing four different control circuit applications illustrating the different switching output contact activation methods and illustrating some examples of supervision feedback connections for monitoring the ON/OFF switching sub-system;

FIG. 12 is a flow chart showing the remote control and monitoring algorithm of the audio sub-system;

FIG. 14 is a flow chart showing the algorithm to program the options of the system;

FIG. 16 is a schematic diagram showing the input channels of the supervision and the output visual status monitors of the ON/OFF switching sub-system of the invention;

FIG. 17 is an illustration of the input signals for the supervision of the ON/OFF switching sub-system;

FIG. 18 is a flow chart of the method used for digitally filtering the AC supervision signals in the ON/OFF switching sub-system;

FIG. 23 is a flow chart showing the auto-dialing and call process algorithm of the system.

DESCRIPTION OF PREFERRED EMBODIMENTS

Figure 1:
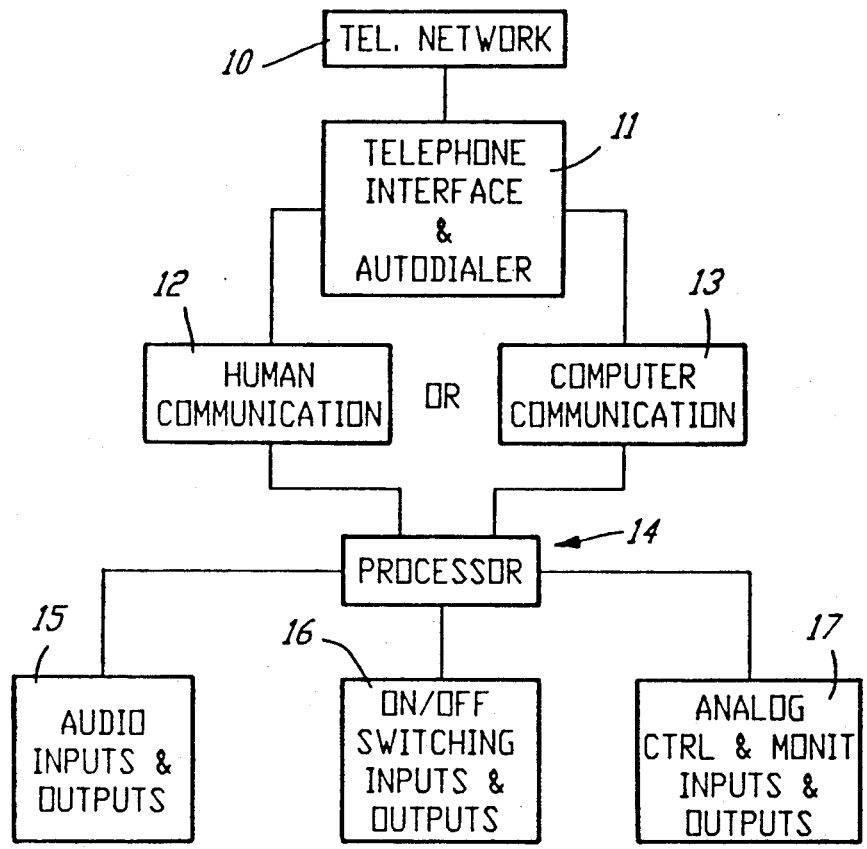
FIG. 1 is a basic block diagram showing the main functions of the system of the present invention.

Referring now to FIG. 1, this block diagram illustrates the general layout of the system including the three sub-systems. The telephone network 10 is connected via a simple telephone jack to the system interface 11. This interface contains an "auto-dialer" which would automatically dial a telephone number should a functional defect occur. The telephone interface of the "auto-dialer" is common for the three sub-systems. Reference numeral 12 represents the user communication with the device by use of a standard DTMF telephone keypad. This communication is also possible via a computer 13. The processor 14 is the control center of the system. It integrates the algorithms and methods implemented. The inputs and outputs are included in 15, 16 and 17, representing the three sub-systems, the "audio", the "ON/OF switching" and the "analog control and monitoring input/output" respectively.

In FIG. 2, a more detailed block diagram for the system is shown. The various interrelated circuits, the heart of which is the microcontroller 22 is illustrated in this Figure. Numeral 18 denotes the protective filter which is incorporated on the printed circuit board and is used to eliminate all transients and surges over the telephone lines, thereby protecting the system. Numeral 19 denotes a circuit which contains a relay which can be in either the hook-on or hook-off position. If all is normal, the relay will be in the hook-off position. When the system answers the telephone, the relay places itself in the hook-on position. The relay is constantly monitored by the ring detector 20 when in the hook-off position. This circuit is used to analyze the pulses from the telephone rings and will be further explained in FIG. 3. The output 20 goes to the microcontroller and is analyzed algorithmically. The hook-on/hook-off relay 19, when in the hook-on position, is connected to a circuit called the "speech circuit". This circuit adapts the impedance of the telephone line with the system, via the speech input, all the sounds, signals, voices, etc., will pass through this wire to the hook-on/hook-off relay contact. This circuit will be further explained in the discussion of FIG. 6. Note that the arrows in the illustrations indicate inputs and outputs. For example, at numeral 23, we note the "DTMF dialer", as it receives orders from the microcontroller, it will send DTMF signals in order to dial the telephone numbers recorded for automatic message sending to the outside. Numeral 26 denotes the DTMF decoder used to internally decode numerical function keyed as well as the frequency from the speech 21, and once decoded, will send them to the microcontroller which will execute either output commands or programmed commands, or monitor the status of electrically operated devices. This is done by the decoded DTMF, as given by human input. Numeral 26' is an independent DTMF input which is used to give commands to the microcontroller via a local dual tone generator. The modem circuit 25 performs the same functions as the DTMF, but rather than, as in the human case, the commands come from the speech circuit, it is connected to another external modem which modulates sounds in order to send digital signals to the microcontroller via output 25'. Numeral 27 denotes the call progress circuit which serves to monitor sounds from the telephone line in order to alert the microcontroller if there is no response from an automatically dialed telephone number after a predetermined number of rings. This circuit will send a code to the microcontroller by communicating the status of the telephone line at that given moment. The status refers to the sounds provided by the telecommunication company in order to communicate a "busy" signal, or other common sounds including a dead (soundless) telephone line. The call progress circuit will convey the status via a binary code to the microcontroller, which will proceed to hook-off or re-dial another number, etc., as will be later explained in the call progress algorithm. The audio switching circuit 28 is the audio sub-system 15 of FIG. 1. It is the sub-system which allows communication with microphone or the loudspeakers in order to monitor or speak with a room, moreover the sub-system which permits the connection to the microphone, speaker, etc. Also present are independent audio-in and audio-out inputs of different impedance which serve to monitor the sounds originating from audiovisual equipment, along with an auxiliary input for a local preamplifier rather than a speaker and microphone. The microcontroller is related to a memory called the EEPROM 29 which is an electrically erasable and programable read-only memory. The content of this memory will be programmed by the user. We will later explain the "custom" codes which the user may program by telephone, such as the access code and the master code which allow reprogramming of the device, the telephone numbers which the device dials in its automatic dialing mode, the number of rings after which the unit will answer the telephone, etc. All this information, along with the setup of the device, must be programmed in the EEPROM and must be retained even during a power failure. The external ROM 30 is a read-only memory used to augment the internal memory of the microcontroller and is devoted to the storage of the words, phrases and the data used in the digitally synthesized voice which will be monitored and controlled by the speech synthesizer. Thus, the microcontroller selects the combination of words which must be used at a given time and sends this to the speech synthesizer which then sends it to the speech circuit so that the listener at the other end of the phone line may hear the message. Therefore, the words, phrases and various codes are all stored in the form of binary codes in the "external voice ROM".

With reference to 31, 31', 32, 32', 35, 36, 35' and 36', all these numerals collectively belong to the "ON/OFF" switching sub-system 16 of FIG. 1. In this description, we are discussing only two input and output channels, however the dash-line between 31' and 32 represents "n" systems with "n" possible input and output channels. The output circuits 32 and 32' are identical. They consist of dry contacts which may be programmed to be normally open, normally closed, momentary action or continuous action. These contacts serve to switch an external electrically operated device, such as a motor contactor, a heating element, lamp or lighting system, etc. The inputs 31 and 31' are used to verify that the command sent by the output was properly executed. For example, the switching on of a motor by the output 32 drives a belt which in turn powers a compressor thereby increasing the pressure in a tank. The tank contains a pressure switch which will trip at a given pressure—this switch will also provide a feedback input 31 and will determine if the pressure is truly built up in the tank. Therefore, this input serves to supervise the output 32. We will later see that this feedback not only serves to monitor the output, but also serves, in the case of a malfunction, to send a signal to the microcontroller which will proceed to shut off the load 32. The microcontroller will then access the auto dialer and will communicate the problem to the user.

The visual indicator No. 1 (35) is a light emitting diode which lights up if switch 31 is operational. This is to say, if output No. 1 is active V1 lights up, similar to 35' which is for V2, but for output No. 2.

With reference to L1 (36), this is a local momentary action push button which is used to switch on output No. 1 if pushed once, and to switch it off if pushed a second time. In other words, L1 and L2 are local commands used to activate or deactivate the outputs without use of the telephone. Note that if the unit is in contact with exterior telephone communication, the operation of these inputs is inhibited. Visual indicator VO ref (33) is the visual indicator connected to the telephone network, for example a light, which will be lit if the device is connected to the telephone network. If the device is not connected to the network, then this light will remain switched off. This is triggered via the switching element, which is a common switch LO (34) which is in series with two wires that provide the telephone connections to the input filter circuit 18. Visual indicator VO (33) is not only a visual indicator of connection, but as the telephone rings, it switches on and lights up in unison with the rings of the telephone allowing one to visualize that someone is contacting the device. This same visual indicator VO (33) has a third function which is the visual confirmation of the zeroing of the master code and access code, described later. This is used in the case of loss of the access code or master code, which are normally programmed by telephone. Due to their loss, either through attrition or forgetfulness, then this must be manually reset by dismantling the device and shorting out two pins on the printed circuit board. At this point, the system will reset the master code to 0000000 and the access code to 1111. Visual indicator VO (33) will blink rapidly in order to indicate the re-setting of the hardware.

With respect to the analog control and monitoring sub-system 17 of FIG. 1, it consists of blocks 39, 39', 40, 40', 41, 42, 41' and 42'. The input for circuit 1A (for analog) will later be described in FIG. 22. It is also shown to consist of input and output channels, but the dash-line between 39' and 40 indicates an infinite number of analog circuits. For the time being, we will represent them as only two channels; two inputs and two outputs. Input channel 39 receives the standard analog signal from a remote source such as an industrial process where we often find transducers which give 4 to 20 mA signals, or 4 mA on the bottom scale and 20 mA on the top scale. This signal will be interfaced to the microcontroller via an A/D converter. The output 40 is capable of incrementally increasing or decreasing the output signal which serves to regulate the value of the actuator. This actuator may be a motor, a valve, or a servomechanism, etc.

Also, note that the microcontroller will maintain the output at a given value or within a specific range. The visual indicator 1A (41) may be a liquid crystal display which will display the value of the monitored analog variable. L1A may be employed as a local switch increasing or decreasing the controlled analog variable, whose output 40 is to be regulated. Circuits 41' and 42' operate in a similar fashion. Note that the microcontroller 22 also incorporates a "time clock" function which is used in the "input/output switching" sub-system giving it the capability of preprogrammed switching (on and off at predetermined times), complementing the telephone dispatched command. The features of this timer, such as its ability to skip Saturdays and Sundays, will be discussed later. The time clock may be disengaged by programming of the device, and then activated by telephone communication. The microcontroller 22 manages all the operations of the system, such as switching, communications, automatic dialing, DTMF decoding, call progress analysis. It even manages the manner in which the speech synthesizer sends its messages. The microcontroller is in fact the heart of the system—and all the methods employed comprise the control software of the microcontroller.

Block 43 represents the power supply and backup battery charger.

FIG. 3 illustrates the telephone input filter 18 of FIG. 2, the switch used to relay the telephone network to the device, the hook-on/hook-off relay 48 to the opto-coupler used to detect the rings thereby sending this information to the microcontroller. Numeral 44 represents the tip and ring connection. Resistor 45 is used as a protective fusible resistor while varistors 46 are used as voltage attenuators in the case of a power surge, by producing a voltage drop across 45, and in the case of an extremely high transient voltage, actually melt the resistor 45, thereby making it act as a fuse. Therefore, this prevents power surges from passing through the electronic circuitry. Switch 47 is similar to switch 34 described in FIG. 2 and is used to switch on and off the system's telephone line, while at the same time, the two poles serve to inform the microcontroller of its "ON" and "OFF" position. The double pole, double throw relay "DPDT" 48 in its rest position connects the telephone line to the resistor-capacitor network 49, 50, 51 52 which composes the input to the ring detector. Resistor 49 serves to limit the current through the two diodes 51 and 52. Capacitor 50 blocks the direct current of the telephone signal while letting the 20 Hz alternating current component pass through. Diode 51 is used to remove the negative AC half-wave, while the light emitting diode 52 illuminates with the presence of a 20 Hz frequency. This signal is then transmitted to the opto-coupled transistor 53 which is then relayed to the input port of microcontroller 54. This microcontroller will proceed to analyze, using a procedure which will later be described, the waves sent through the telephone lines when the telephone rings. When the microcontroller counts a given number of rings, it will ask the device to "hook-on". Transistor 55 will receive this signal from the microcontroller to energize the coil of relay 48, thereby switching the relay contacts to the hook-on position. In this position, the ring detector circuit is disconnected from the microcontroller while circuits 56, 57 and 58 will be connected to the speech circuit. The speech circuit has an impedance in Ohms required by communication companies, therefore, the line will be loaded as per this regulated impedance. Diode bridge 57 is present in order to prevent the reverse polarity of the tip and ring. Zener diode 58 is used to augment the protection already provided by 45 and 46 in case the voltage exceeds 40 or 50 volts. It will provide protection from sudden transient surges (voltage spikes). Capacitor 56 eliminates radio frequencies and filters high frequency noises.

The transistor 59 and light emitting diode 60 are used as visual indicators and are illustrated in FIG. 2 by block 33. This light emitting diode will turn on and off as the telephone rings, and will also go off if switch 47 is in the off position, as shown. If this switch is in the ON position, the telephone network is connected to the device and the light emitting diode 60 will turn on. This same diode, as previously described, will blink rapidly if the user resets the access and master codes in the circuit.

Figure 4:
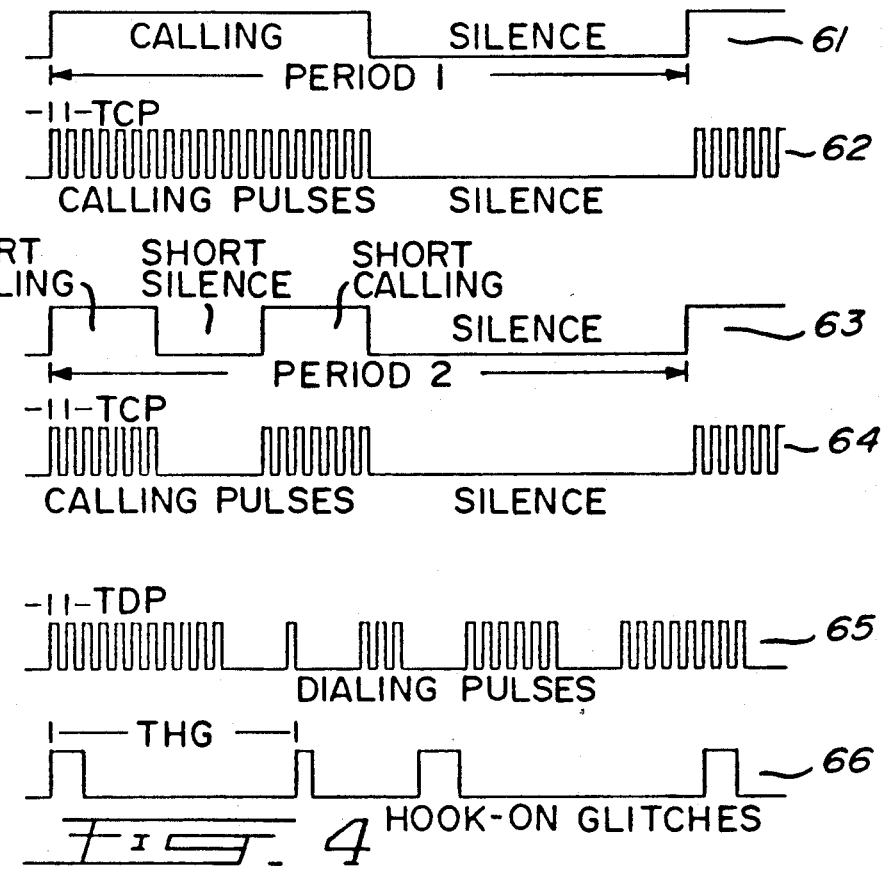
FIG. 4 is an illustration of the calling signals and pulses vs. the other undesirable signals to be rejected.

The square waves 62 of a telephone ring are illustrated in FIG. 4. These are seen at the output of the opto-coupled transistor 53 when the telephone rings. The envelope of these waves, representing the total time for a calling pulse and silence, is illustrated in 61.

Alternately, some telephone companies and office telephone system manufacturers (for internal calls) employ a double ring calling pulse 63.

The 20-cycle sinusoidal ringing signal 64 is similar to the one "seen" by the opto-coupled transistor. Due to the differences in the calling pulses generated by different telephone system manufacturers and between one country and another, the microcontroller has been equipped with a method of analysis for the calling pulses. There is a switch (on either the hardware or software) which is always in the off position. However, when the device is installed by the user, this switch is placed in the on position, thereby placing the device in the learn mode. The user will then call from another telephone and let it ring five or six times. The microcontroller will study the particular calling pulse. The user then disconnects the device placing the switch in the off position. The system will have programmed the particular calling pulse pattern within the EEPROM. The device will then compare calling patterns from incoming calls to these standards.

The pattern generated by a rotary dial telephone connected on the same line is shown in 65. When we dial a number on such a telephone, these may be transmitted to the microcontroller which must discriminate and eliminate such pulses since they represent nothing. The algorithm which analyzes and rejects these pulses will later be described. The square waves 66 represent hook-on/hook-off "glitches". These glitch patterns are sensed by the microcontroller via the opto-coupled transistor. If they do not conform to the pattern of the telephone rings, they will be eliminated. The algorithm in FIG. 5 represents the filtering method of these undesired signals and is used to validate the actual calling pulse.

Figure 7:
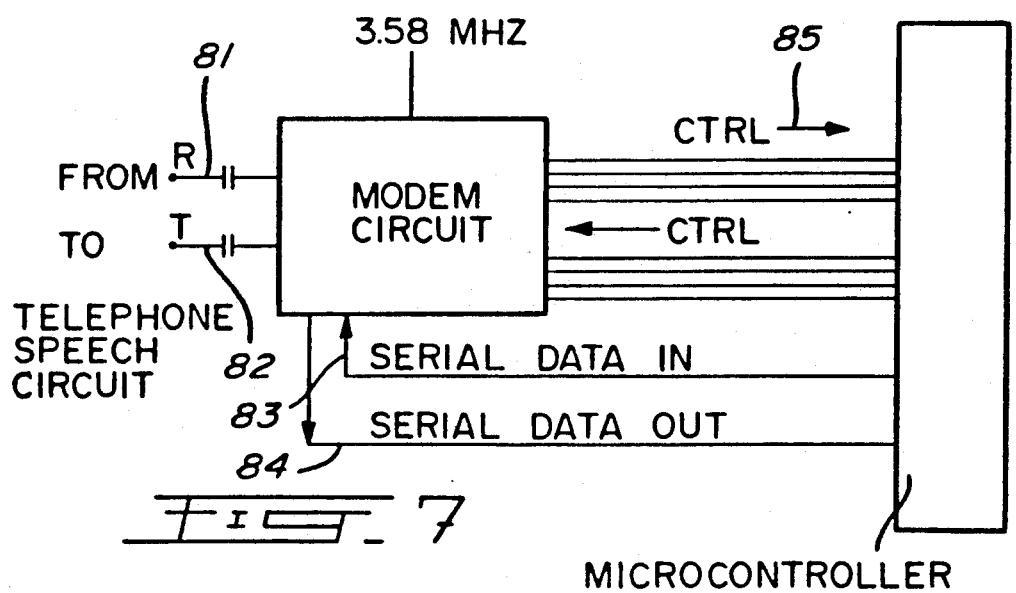
FIG. 7 is a schematic diagram showing the connections of the MODEM with the microcontroller and the telephone interface.

FIG. 6 illustrates the detailed speech circuit 21 of FIG. 2 with its inputs, outputs and its interconnections with other blocks. The audio signal output is accessed at 71 and 68. These two wires are the output of push/pull amplifier used to drive a speaker. This signal, available between 68 and 70 is caused by voices from external telephone sounds along with the signals emanating from an internal microphone 70. The output audio signal coupled with the input to the DTMF decoder. The sounds coming from a distant telephone will be decoded. This audio signal is also coupled with the call progress circuit which serves to analyze the sounds from an automatic dialing to recognize a busy signal, an unanswered call or a defective communication. This same audio signal if connected with the modem circuit input thereby permits the analysis of the modulated signals coming from an exterior modem connected to the device through telephone lines. The microphone input to the speech circuit is shown at 70. This input, as described later, is used to send to an external telephone the sounds within the room where the device in installed. The DTMF input 69 is used to send all the sounds other than those picked up by a microphone, such as the touch tone sounds generated by the device during an auto dialing call and those sent to the telecommunications company. This DTMF input is also used by the speech circuit as an input for the voice generated by the speech synthesizer or by the internal modem. The output signal of this modem, shown in FIG. 7, is sent to a remote modem. Mute control 72 is a sound inhibitor towards the output 71 and 68. While the auto dialer dials a telephone number by pulse or touch tone, the mute control attenuates the audio output so that these sounds are not processed by the internal DTMF decoder. These tones are not meant for the device but for the telephone company which will link the device to an external telephone. The microcontroller 22 will trigger the automatic dialing by sending the information to the DTMF dialer via point 73 during an emergency interruption. This information, or numbers, are stored in the memory of the EEPROM 29. If the telephone company or this device fail to understand the DTMF codes, it would be possible, via the microcontroller, to auto-dial using the pulse mode rather than the DTMF dialer 37, see FIG. 2. The dialing of the telephone numbers will occur with the rapid opening and closing (10 pulses per second) of the hook-on/hook-off relay. In the programming of the initial system configuration, the option for pulse or DTMF dialer is provided for, as will be discussed later. The call progress circuit receives audio sounds in the input of 68 and contains a binary output 76 which is made up of three bits. The eight possible combinations of these three bits will tell the microcontroller the status of the telephone line. For example, 000 may indicate that the line is functional, 001 may indicate an occupied telephone connection, etc. The valid data output 77 is used to inform the microcontroller that the data input 76 is valid and may be accepted. Connections 75 are used as control functions between the call progress circuit and the microcontroller. The DTMF decoder 74 is used to decode the tones and frequencies which emanate from the speech circuit by line 68. These frequencies, generated by the external telephone keypad, are decoded and the results are transmitted to the four-bit data bus 78 which gives a possible sixteen combinations for the numbers on the keypad. The valid data 79 is similar to the function of 77. The DTMF input 80 is an auxiliary input. This input permits the inputting of local commands or to locally program the microcontroller with a local DTMF generator without the use of a remote telephone.

FIG. 7 represents the modem circuit. Input 81 represents the analog input to the modem and is connected to the audio output of the telephone speech circuit of FIG. 6. The modem transmit output 82 passes through the telephone speech circuit before being sent to the outside, while 84 represents serial data sent to the microcontroller once demodulated by the modem circuit. The serial data in 83 comes from the microcontroller and are modulated before transmission to an outside modem. The controls 85 are used to connect the modem circuit with the microcontroller for data manipulation.

Figure 8:
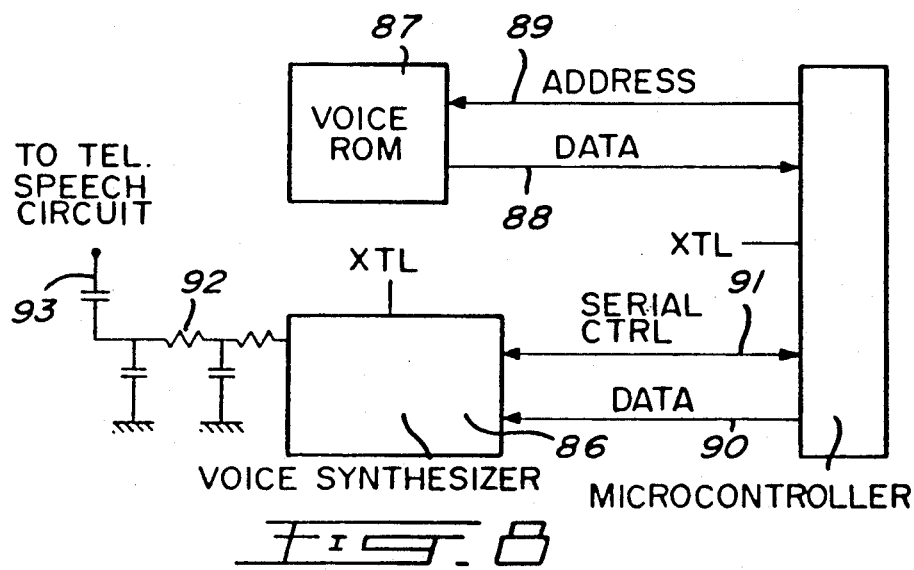
FIG. 8 is an interconnecting circuit diagram of the voice synthesizer with the microcontroller, the voice ROM and the telephone speech interface.

Referring to FIG. 8, the speech synthesizer 86 is an integrated circuit used to synthesize words and phrases according to the serial data 90 coming from the microcontroller. This data is stored in the voice ROM 87, chosen by address 89 and sent to the microcontroller to be subsequently transmitted to a speech synthesizer 90. The vocal signal is transmitted through filter 92 before being finally sent to the telephone speech circuit in order to produce the messages communicated to the user on an external telephone. Control signals 91 are bidirectional linking the voice synthesizer 86 with the microcontroller for the data manipulation 90.

Figure 9:
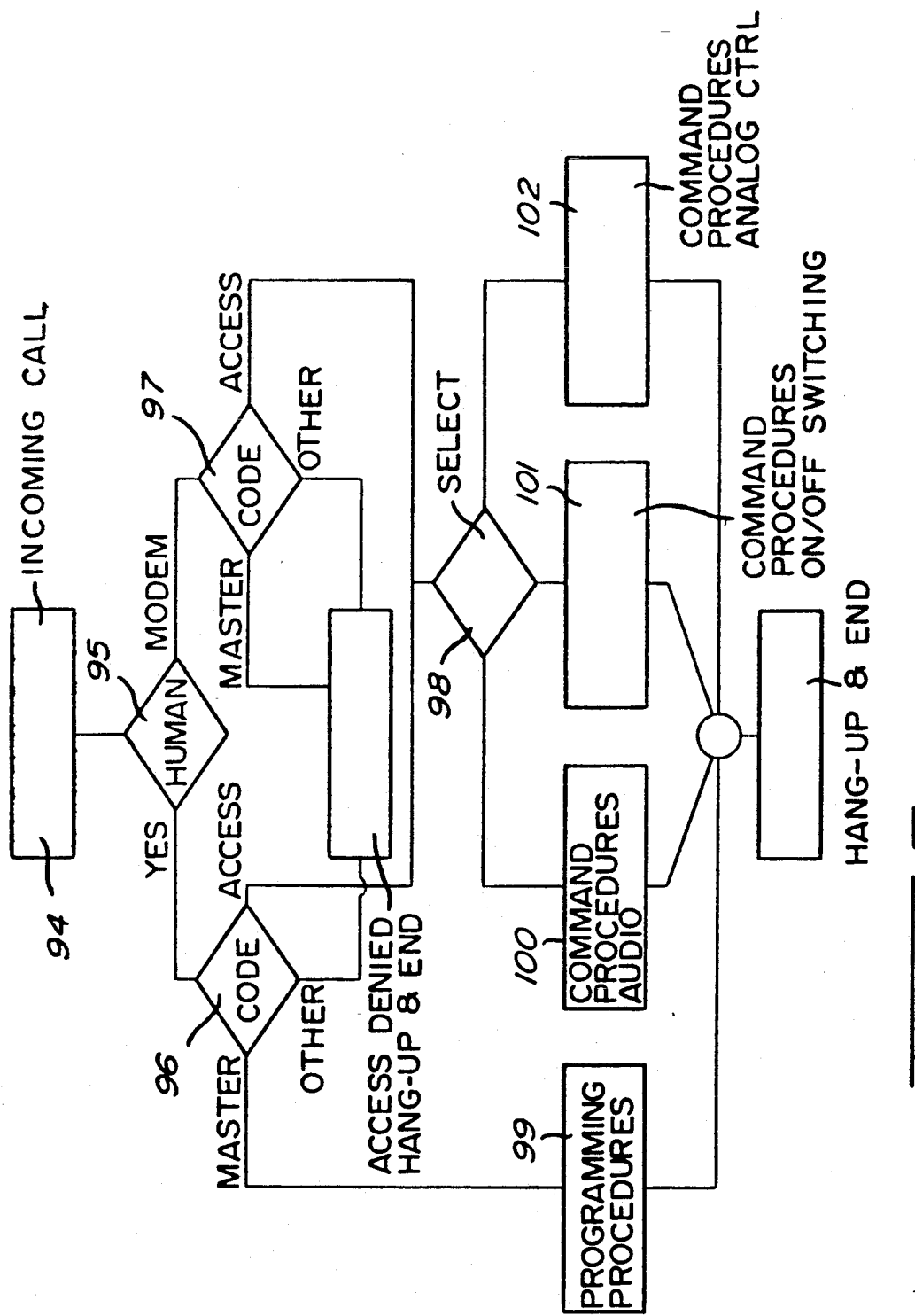
FIG. 9 is a flow chart showing, via incoming calls, the access to remotely controlling, supervising or programming the system.

FIG. 9 demonstrates the programming or command access algorithm. After detecting a given number of telephone rings, the device connects itself to the telephone line (hook-on position). Function 95 discerns whether it is a modem or human command on the other end. If it is a human command, the communication is made with the DTMF mode, and in the case of a modem, then the communication is accomplished with modulated signals. The human on the other end of the telephone line may get access by inputting a code. If this is an access code, that is to say a valid four-digit code, the user may access the sub-system selection by command 98. If it is a master code, a seven-digit code, the user will directly access the programming procedures 99. If the code is neither the access or master code, the system denies access and hangs up. Similarly for 97, the system verifies if the code is an access code transmitted by modem, in which case, it will gain access to the commands via 98. If it is the master code, or any other code, access is refused and the device hangs up. It is therefore not possible to program the system via point 99 using a modem. This may only be done with a DTMF communication. The programming procedures 99 will be shown in another algorithm. The audio system procedures will also be discussed later, as will procedure 101 and 102.

The option codes shown in FIGS. 10A, 10B and 10C are codes which are stored in the EEPROM memory and retained in the case of power failure. These codes are very important in that they are the starting point for the operation of the system and sub-system. The codes shown in this Figure are the default codes pre-programmed in the manufacturing of the system, and may be changed by the user according to taste or application. Numeral 103 denotes the personal access code. This is a four-digit code which may go up to 9999. As described in the preceding Figure, this code allows access to the command mode only, and not the programming mode of the option codes of the system. Numeral 104 denotes the seven-digit "high level security programming master code". This code gives us access to re-progam any of the codes shown in FIGS. 10A, 10B and 10C. The first four digits of this code cannot be the same as the first digits making up the personal access code 103. These two codes 103 and 104 may be reset to their default value with the hardware, in case they are forgotten, by shorting two pins on the printed circuit board. Other codes will remain unchanged.

The "device identification transmission code" 105 is employed in identifying a malfunction as monitored by the system. This code is used to communicate, when the auto dialer calls the user, which of the monitored devices (from 0 to 999 units) is malfunctioning. The number of rings after which the device will pick up the telephone line is given by 106. This number may be from 0 to 9. If the device is programmed to 0 rings, the system will respond but to a unique input condition; two rings, hang up, call the device a second time at which time it will answer after the first ring on the second call. It is programmed in such a way so as to permit two devices to be connected to the same telephone line. This would permit the user to program the first device to 5 rings, for example, and the second device to 0 rings. The first will respond if we let the phone ring 5 times, while the second device will only respond if we let the phone ring twice, hang up and call again. They both cannot answer the same call. Therefore, this permits economical use of the user's telephone network; a unique telephone line for two devices. This feature also allows the user to connect a telephone answering machine to the same telephone line as the device. If the user wishes to communicate with the device, he lets the phone ring twice, hangs up and calls again; thereby circumventing the answering machine if it is programmed to answer after three or more rings.

Numeral 107 denotes the selection of the language used for the voice synthesizer. 0 is for English 1, 2, 3, . . . up to 9 different languages may be permitted, if necessary. Numeral 108 denotes the pulse/tone selector for the auto dialer; 0=pulse, 1=tone. If the installation location of the device does not accept DTMF codes for the dialing of telephone numbers, then programming in pulse mode is imposed. For this case, set 108 to 0. If DTMF is permitted, the set 108 to 1. It is pointed out that even if the telephone line does not permit dual tone, the programming and commands for the device may be made in dual tone since the device integrates an internal DTMF decoder. Numerals 109 and 110 denote the two telephone numbers programmed for auto dialing. The first digit of this series of numbers defines whether communication is to be made with a human 0 or an external modem 1. These numbers are dialed sequentially, as will be later described by the respective algorithm. If the call is local, then the number dialed, for example 555-5555 will be connected, and the next four digits of the number will be ignored by the telephone company. However, if the first digit of the telephone number is a 1, then the number dialed is long distance and may be followed by a regional or area code, such as 1-514-555-5555. The default number programmed in the system is a "no service" number.

Figures 10D, 11:
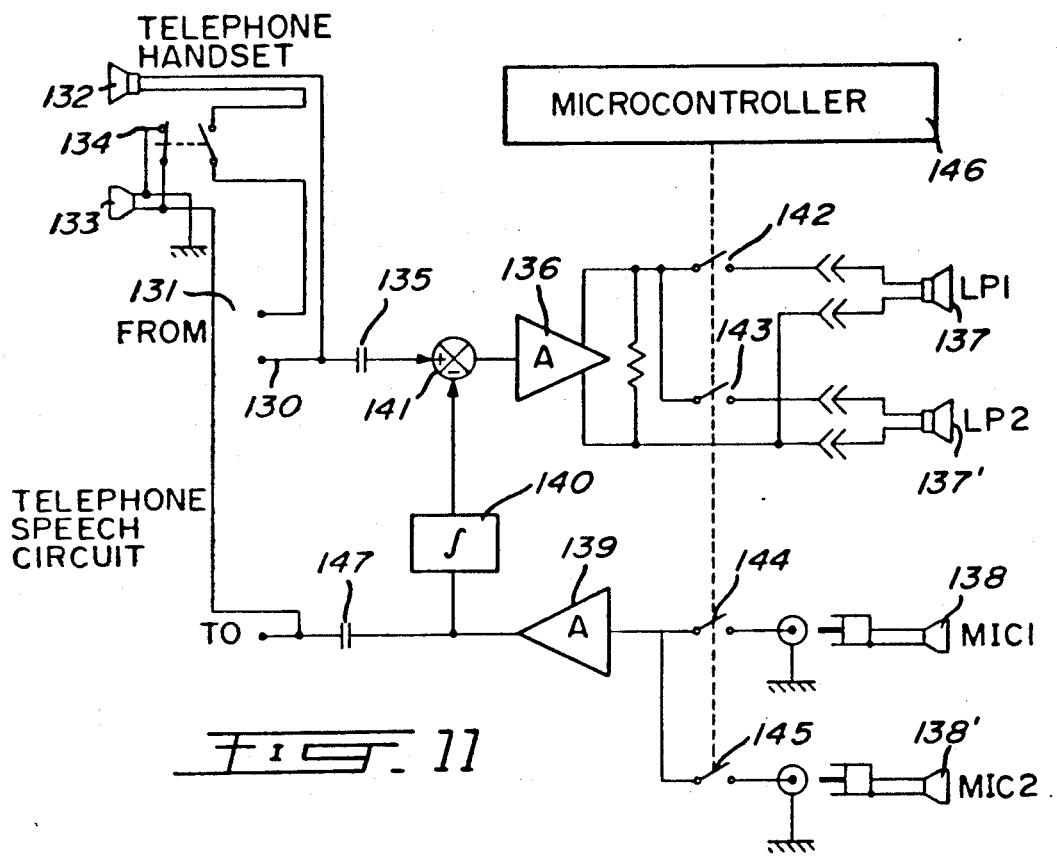
FIG. 10D is a table showing the switching application attributes of the output channels when programming the ON/OFF switching sub-system.
FIG. 11 is a schematic and interconnecting diagram of the audio sub-system showing the remote controlled audio elements by telephone via a microcontroller.

All the option codes in FIG. 10B, with the exception of 118, are part of the "ON/OFF" switching sub-system, with 111, 112 and 113 being closely related. Option 112 is the "output contact arrangement", with 0=normally open and 1=normally closed. Considering that our system simply has two channels, the right cell, which is doubly framed, always represents the second channel. In certain applications of this sub-system, it is important that the output channel or the dry contact of the output channel be normally open while for other applications it would be normally closed. Before going through the explanation for 113 and 111, it is important to define the meaning of both the output channel and the control circuit. The term output channel with the dry contact refers to latching relays, (see FIG. 19) reference Nos. 190, 193, 192, 191. The contact of each relay is connected to two terminals, and this terminal switches one external low voltage circuit supplied by the user. The user programs each of the contacts to be either normally open or normally closed. Additionally, these contacts are programmed for continuous action or momentary action or momentary pair action according to each application (see FIGS. 10D and 10E). The term control circuit as used here refers to one output circuit connected to the sub-system and is used to control one load only. If a load is to be controlled by means of a momentary pair contact action, two output channels are required to handle one control circuit, for example, see FIG. 10E. A control circuit serving a motor needs two output channels of the sub-system, each programmed for momentary pair contact action. In the case of a lighting system using low voltage control, the control circuit will, likewise take two output channels of the sub-system, each programmed for momentary pair contact action. A control circuit switching a hot water heater on/off uses only one output channel programmed for continuous contact action. A control circuit to set a security system "on" and to reset it "off" uses always only one of the channels programmed for momentary contact action. Choice of contact action determines the number of available control circuits. When all output channels are programmed for continuous or momentary or a combination, the sub-system handles a maximum number of control circuits, in this case, two control circuits. When momentary pair action is selected, only one control circuit is available in our case, (see Mode Selection Table-FIG. 10D).

Referring to FIG. 10E, there is shown the coil 257 of the contactor for motor starting, when controlling a motor. Each of the two output channels 260 and 261 must be programmed for momentary pair action. The output contact 260 used for starting will be programmed normally open. The contact 261 used for stopping the motor will be programmed normally closed. The start push-button 255 is located in the control panel of the motor and 256 is also the stop push-button located also in the motor control panel. An auxiliary contact 259 of the coil 257 is used to maintain the start action. The thermal overload contact 258 protects the motor. The supervision input terminal block 264 corresponds to channel No. 1 of the system. The normally open pressure switch 263 will close when the motor builds up a pressure. Contact 262 is the auxiliary contact of the coil 257. A few seconds after starting of the motor, contact 263 will close and contact 262 also will close and the supervision terminal block 264 of channel one will receive the feedback signal. In a low voltage control of a lighting system, both output channels on and off, contacts 250 and 251 are programmed normally open and provide momentary pair contact action. The momentary pulse lasts half a second. If a pair of output channels is programmed for momentary pair contact action, the first push-button 181 of FIG. 16 and push-button 36 of FIG. 2, will switch the load on. The second push-button will switch it off.

Referring to FIG. 10E, there is shown the coil 266 of the contactor for controlling a heating system. The coil is switched on and off by a programmed continuous action of contact 267. The thermostat normally closed contact 268 will cycle on and off to keep the temperature of the heated water constant. The thermostat 269 which is normally open will give the feedback to the supervision input 270. In the security system 271, the momentary key switch 272 is used to trigger the security system and also to reset the security system if it is turned again. The momentary action contact 273 of one output channel will trigger or reset the security system by telephone. The internally continuous action contact 274 in the security system will give the feedback to the supervision input 275 of the sub-system to be monitored as set or reset, or as they say in security slang, as in DAY position or NIGHT position.

In the application mode option 111 of FIG. 10B, the digit which we may place in the right cell may not be greater than 4 since the maximum for a double cell system of two channels is 4 modes, as shown in FIG. 10D. In choosing the first mode in FIG. 10D, the device will be programmed for continuous action on channel number 1 and continuous action on channel number 2. In the "auto-off" function 113, it must be noted that if the digit, in the case of the second channel, is followed by an apostrophe, depending on the application mode chosen in 111, the data entered in this second cell will be refused, if the control circuit of the selected mode monopolizes two output channels.

The auto-off and emergency off 113 are features of the system which the user has the option to program enable or leave unused. It is used in an application involving limit pressures or temperature, pumps, or motors or similar loads programming the auto-off option and the emergency-off option causes the system to instantaneously and permanently disconnect the load if a monitoring circuit detects stoppage of a load which should be operating according to the position of the corresponding output channel. If when monitoring, feedback of supervision is interrupted, the system will cause an automatic dialing of the telephone numbers as shown in 109 and 110. The difference between the emergency-off and the auto-off is explained as follows. If the auto-off mode is programmed, that is to say 1, the user may remotely reconnect the load in question by re-telephoning, even if it was previously disconnected. If the malfunction persists, the system will shut it down again. However, if the emergency-off is programmed, that is to say, a 2 is placed in this cell, then it would be impossible to turn on a load once an interruption is caused by a malfunction. A local reset will reconnect the load by pressing button 181 of FIG. 16 five times. If in 111 the chosen application comprises of one or two momentary channels, as in mode 2 and mode 3 in FIG. 10D, in 113 the program will refuse all the auto-off and emergency-off for each momentary channel. The reason for this is as follows, as shown by 272 in FIG. 10E, if 273 is used to trigger-on or trigger-off the alarm system, the supervision 275 will serve to give the information by telephone regarding the status of contact 274 and not to deactivate contact 273 by sending a second pulse. In the case of "mismatch", this pulse, rather than trigger-off may trigger-on the system. For option 115, the "auto-dialing function", 0=disable, 1-enable the auto-dialing, has little to do with the option chosen in 113. If the auto-dialing is selected, it will be executed for all disaccord or conflicts between the supervision and the state of the command.

Examples of disaccord or conflict exists between the supervision monitoring input and the status of the output channel, if the system responds to a telephone command to connect load 1 and the load cannot be turned on. For example, the load may be a broken drive belt, defective heating elements, burned out filament, etc. Monitoring input of channel 1 receives feedback of 0 volts or if the system is functioning normally, and after a few minutes or hours, something goes wrong with the supervision input, the system will provoke an interruption and wil auto-dial to send to the user a malfunctioning message. We call this a disaccord or a conflict between the output status of the channel and the input supervision monitoring status. Programming the option function 115 with 1 (see FIG. 10B), will enable the auto-dialing features and programming it with a 0 will disable the auto-dialing monitoring feature. The code 114 represents a feedback waiting delay.

Referring to FIG. 10E, coil 266 controls a heater element in a water tank. When phoning the system to command contact number 267 to close, the temperature of the water will not rise fast so thermostat 269 will close maybe after ten minutes and during this time of ten minutes, we could have a signal of disaccord because the supervision 270 will not be in accord with the action of closing of contact 267. The delay needed to inhibit temporarily this non-correct disaccord has to be set in 114 of FIG. 10B option. The proper number to program in this case is 7, because 7 gives a delay of 640 seconds which is equivalent to ten minutes and forty seconds. Please note that the setting numbers are not linear with the delay seconds. 0 is used for one second, 1 is used for ten second delay, 2 is used for twenty second delay and 3 is used for doubling twenty seconds, that means forty seconds. Number 4 is used for eighty seconds, 5 for 160 seconds, and so on. Option functions 116 and 117 are the time clock options. These two options are used to turn on or turn off the output channels without telephone communication. These are used as a timer independently from the commands received by telephone.

In 111 an application where one control circuit is selected with two momentary pairs of contacts, in 117 if the user wishes to turn on the load, say at 7:20 a.m. to 5:30 p.m. for every day except Saturday and Sunday. We therefore enter 07:20 for 7:20, 17:30 for 5:30 p.m. and the last digit is zero because we want the system to stay OFF on Saturday and Sunday. The second series of digits will not be accepted because we have only, in this case, one control circuit because we programmed 111 with a momentary pair of contacts as shown in action mode No. 4 (FIG. 10D).

Options 111 to 115 are in effect together with option 117. Numeral 116 denotes the real time clock setting when we set up the system and these settings are necessary to synchronize option 117. The programming option 118 is associated with the audio sub-system and configurates the switches 142, 143, 144 and 145 of FIG. 11, to enable two-way audio communication for channel 1 if programmed at 0. Switches 142 and switch 144 will stay closed to enable the speaker and the microphone of channel 1. By entering a 1, switch No. 142 will stay open. Switch 144 will stay closed, only if the microphone of channel 1 is enabled. In option 118, if we enter a 2, this will disable only the microphone of channel 1 which means that switch 144 will stay open and switch 142 will stay closed. Entering a 3 in 118 disables completely the audio features of channel 1. The same is applicable for channel 2 which consists of switch Nos. 143 and 145.

In FIG. 11, we show a complete audio system with the controls. The terminal 130 is the input audio of this circuit which comes from the telephone speech circuit. The two wires 130 and 131 come from the push/pull output amplifier from the telephone speech circuit to be connected to the telephone handset shown at 132, and called also the speaker of the handset which is normally an open circuit because switch 134 is not pushed on the handset. The microphone 133 of the telephone handset is used to work with the speaker 132. When switch 134 is not pushed, the signals generated by the microphone 133 are shorted to ground. To speak and listen with this telephone handset, the user should push the switch 134. This telephone handset is auxiliary and is installed close to the system to allow occasional communication with two persons, one close to the system and the other person out of the premises using another telephone. Capacitor 135 allows AC coupling between the signal generated by the telephone speech circuit and amplified by the amplifier 136 which has a push/pull output to drive speaker LP1 and LP2 137, and 137'. Microphones 138 and 138' could be installed in rooms and the signal generated by these microphones is amplified by the amplifier 139. This amplified signal is AC coupled with capacitor 147 to finally be connected to the microphone input of the telephone speech circuit (see FIG. 6—reference 70). To eliminate feedback between the microphone and the speaker of the same channel, an automatic gain control 140 with 141 serves to change the gain of the amplifier 136 when somebody is speaking in the microphone 138 or 138'. As shown in FIG. 10C, all of these programming options are in the configuration of the analog monitoring and control sub-system.

Referring to FIG. 10C, options 119 and 120 are the type of read units and the name of the unit for the speech synthesizer messages. The two first digits are reserved for channel No. 1 and the next two digits are for the channel No. 2. The number entered in the programming option 119 allows the microcontroller (see FIG. 8) to retrieve from the voice ROM 87 the proper message unit to be sent by the voice synthesizer to the telephone network. Example, if the type of unit read by the input transducer of channel 1 is the temperature, the message sent by the voice synthesizer should be the word "temperature". In the voice ROM 87, the listed type of units are 45 if the type of unit used is not listed, the user should program 00 for the word "reading". Example, the message will be "the reading is" or "the temperature is" or "the pressure is", etc. . . .

Option 120 in FIG. 10C is used to program the good name of the unit needed. In the same way, the voice ROM lists 45 names of units. Example: degrees Celsius, degrees Fahrenheit, kilopascal, psi, etc. If option 120 is programmed by 00, the word will be "units" sent as a partial message by the voice synthesizer and an example of a full message will be: "The reading is 23 uits" or "The temperature is 25 degrees Celsius" or "The pressure is 2.5 psi".

Figure 21:
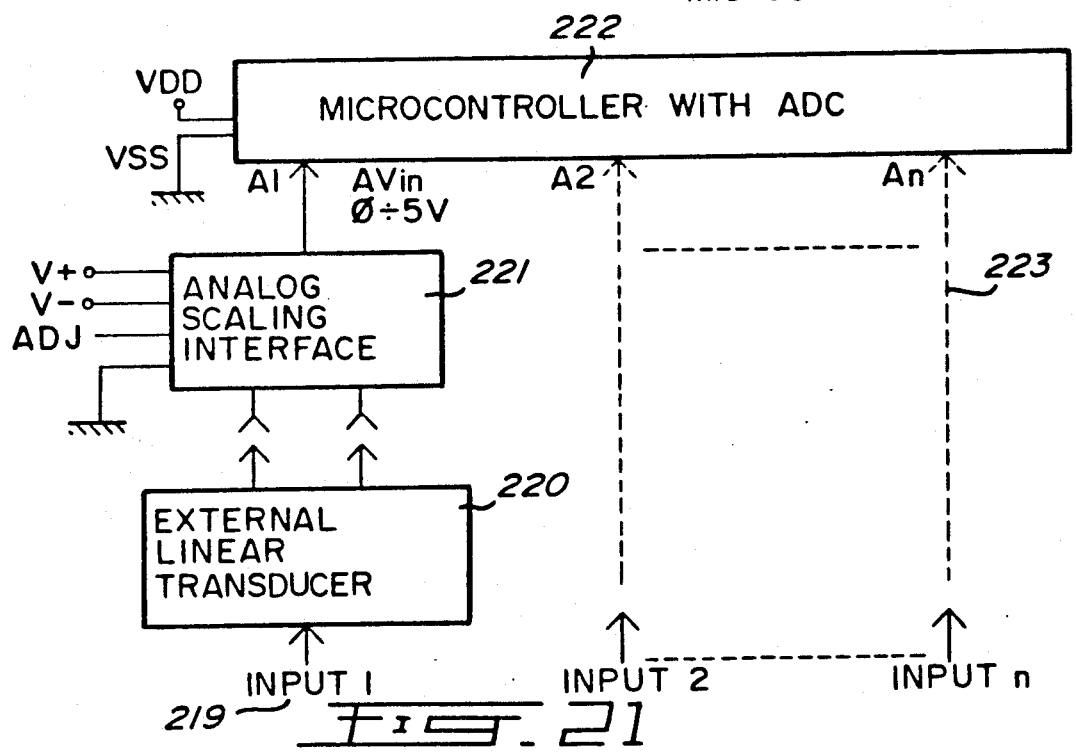
FIG. 21 is an interconnecting block diagram showing the analog input interface between an external linear transducer and the A/D converter for the analog control and monitoring sub-system of the current invention.

Referring to FIG. 21, the external linear transducer 220 translates an input physical variable to an electrical standard signal, for instance, from 4 to 20 mA, and this signal of 4 to 20 mA is interfaced by 221 analog scaling interface to a signal of 0 to 5 volts DC which is proportional to the input variable read by the transducer. The internal A/D converter included in the microcontroller 222 will allow to digitalize the actual instant value of the read variable by the transducer with a ten-bit output definition. Numeral 223 is the last channel used.

It is pointed out that the present system is not limited to a two-channel system.

Figure 22:
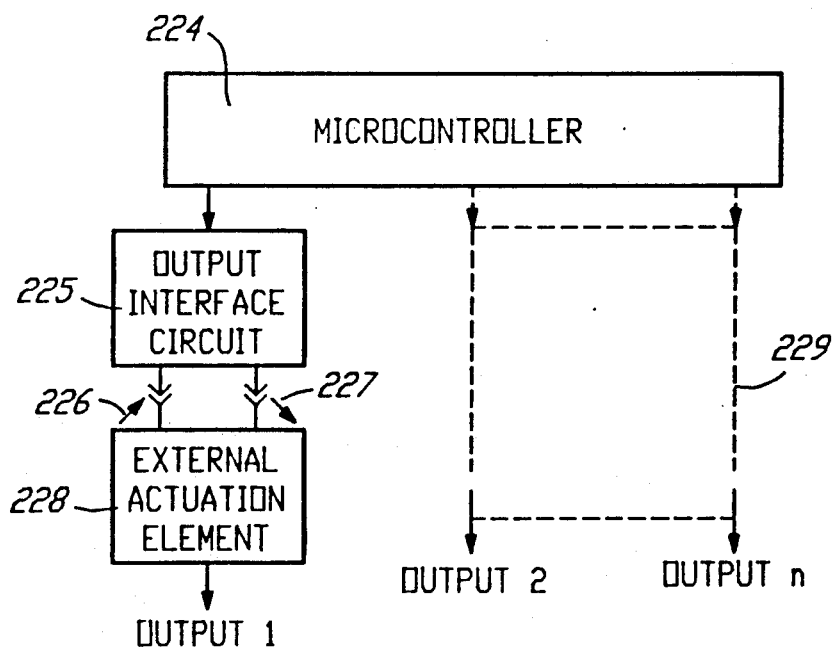
FIG. 22 is an interconnecting block diagram showing the output regulation interface between the microcontroller and the external linear actuator for the analog control and monitoring sub-system.

In option 121 of FIG. 10C, the programming cells associated with channel No. 1 are composed of four digits. The first digit specifies the minus sign and the three others, the bottom scale magnitude setting. The message sent according to the reading of the input variable could be in a range of 999 sampling points. In the top scale magnitude setting 122, the first digit designs the minus sign, if the minus sign exists, and we should enter a 1 in the first digit. As shown in FIG. 22, the external actuation element 228 could be a valve, a motorized potentiometer, or any kind of actuator that should be regulated. The output interface circuit 225 will generate signals, pulses, or other types of variables which will keep the external actuation element regulating the variable which is read by the external linear transducer 220 of FIG. 21. The analog monitoring and control sub-system is also a regulator sub-system; see FIG. 10C.

Option 123 in FIG. 10C is the center window reference for regulation. Numeral 124 denotes the boundaries of the window in which the reference is in the middle for tracking the regulation. The minimum delta of these boundaries could be set to 1/100 of the full scale which means a regulation of plus or minus 0.5% according to the center window reference 123. The maximum delta regulation boundaries is 99 which means 1/10 of the full scale which gives a regulation of plus or minus 5% according to 123.

Option 125 is the decimal scale divider and has three values: 0, 1 and 2.0 divide by 1, 1 divide by 10 and 2 divide by 100, all the values being read according to 121 to 123. For example, if we set 121 as being 000, and 122 as being 100, that means 0100 if the decimal scale divider is set to 2 for channel No. 1, and that means that the value read has to be divided by 100. The voice synthesizer 1 when the transducer will produce 20 milliamps which will be 1.00 instead of 100. If the transducer gives 8 milliamps, the message will be 0.5. Programming option 126 allows interaction between the analog control and the monitoring sub-system with the ON/OFF switching sub-system and if the number entered in the cell is 1, it allows this interrelation. This means that if the variable stays out of the boundaries for more than the delay setted in 127, the auto "OFF" or emergency "OFF" option 113 will deactivate the channel related to these variables by stopping a motor or switching off an external element that affects these variables. This interrelation is not a regulation option, but an extra safety of the system used as an over-limit or cut-out.

Option 127 allows the user to program the reading rate of the sampling in the analog monitoring and control sub-system. Some variables do not change fast. For instance, temperature could change very slowly. The time constant of the variable should be taken into consideration by programming the proper reading and the regulation rate. The variable reading rate could be set from 1 second to 10 seconds; 1 second for the faster time constant and 10 seconds for the slowest. This option also is not exclusive. If we use two cells per channel, reading and regulation rates could be set higher than 10 seconds. This rate is also the speech message rate, which means that when the user is calling the system to monitor the analog variable by synthesized voice messages, the first message is complete and the next sample messages are shortened. Example: the temperature is 25.6 degrees (first message), 25.7 degrees (second message), 22.2 degrees (third message), etc.

Option 128 in the analog control and monitoring system permits to command by telephone to shift up or down temporarily the center of the window reference to increase or decrease the tracking level of the regulation (temporarily). Then we proceed to the programming procedure algorithm 99 (see FIG. 9).

Referring now to FIG. 14, there is shown the algorithm when calling from another telephone line. After a predetermined number of rings, the system will answer by giving a message from the device identification transmission code. The user should enter the master programming code. If this is correct, message 160 will follow: "Please enter the option number you wish to program". At 161, the option number corresponding to one of the programming options shown in FIGS. 10A, B or C is entered by using the keypad of the touch tone telephone. After the option number is entered, message 162 will send you a message that confirms the option number you have entered. If correct, you should enter the new option code, if not, you will try again. After you entered your new option code, 164 will confirm by message all the numbers you have entered to program the new option code. If these numbers correspond to your programming, you can hang up or you can program another option, or the same option if necessary. As shown in FIG. 9, item 98 selects the command procedure of the three sub-systems. If the number of channels is greater than 2 for each sub-system, connection of supplement channels could be modular and interconnected with the main system via twisted pairs of wires. Each of these modules has its proper microcontroller and the main microcontroller of the system will manage the interconnection of each sub-system and each module with the system.

Now we will explain the command procedure audio algorithm 100 with reference to FIG. 12. This procedure is designed to function with humans and by the use of the DTMF codes to command the speakers or to control the microphones. From an external telephone line, the user telephones the system and after a predetermined number of rings, the device answers by giving the device identification transmission code. The user should enter his personal access code. If this code is correct, after selecting the number which gives him access to the audio sub-system, an initial message 148' will say: "Which audio channel would you like to select?" The user via the commands of the DTMF codes enters the audio channel number 1 or 2, 149. After entering the channel number, a confirmation message will say: "You have entered channel No. 1—proceed or not?" If correct, the device will permit the user (see 151) to wait on the line, to speak or to listen to what is happening in the room where the microphone of channel 1 is connected. The time which the user can stay on the line is limited by regulations of the telecommunication companies. So if the user does not touch a DTMF tone key during this allowed time, the system will hang up automatically, (see FIG. 13). The stay-in-line algorithm 154 explains the stay-on-line procedure. The on-line timer is reset each time you enter a DTMF code except the star (*). If the user does not touch any command of the DTMF sounds, or frequencies, before the on-line timer overflow, a time-off warning message 155 (that is a beep) advises the user that if he does not touch any command of the DTMF codes, except the star (*), the system will hang up automatically in a few seconds. Touching the star (*) of the keypad obliges the system to hang up automatically, even if the on-line timer is not overflowed.

As shown in FIG. 12, there is provided a DTMF interrupt test 152. If the user interrupts by DTMF before the time-off warning message described in FIG. 13 (155), the system will understand that the user wants to scan another channel to listen or speak. If it is yes, the confirmation message 153 will say to the user that he has asked for interruption to change the channel. The next message 148' will be the initial message that is: "Please enter the channel you want to monitor" and so on. This terminates the audio command procedures.

Figure 13:
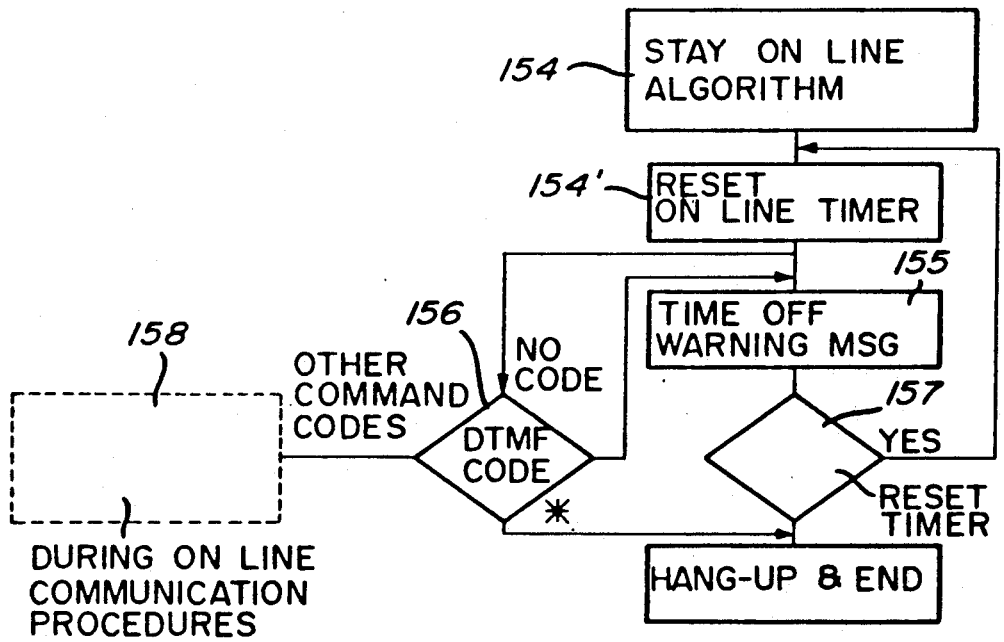
FIG. 13 is a flow chart showing the stay on line and automatic hook-off algorithm when the system is communicating via the telephone network.
Figure 15:
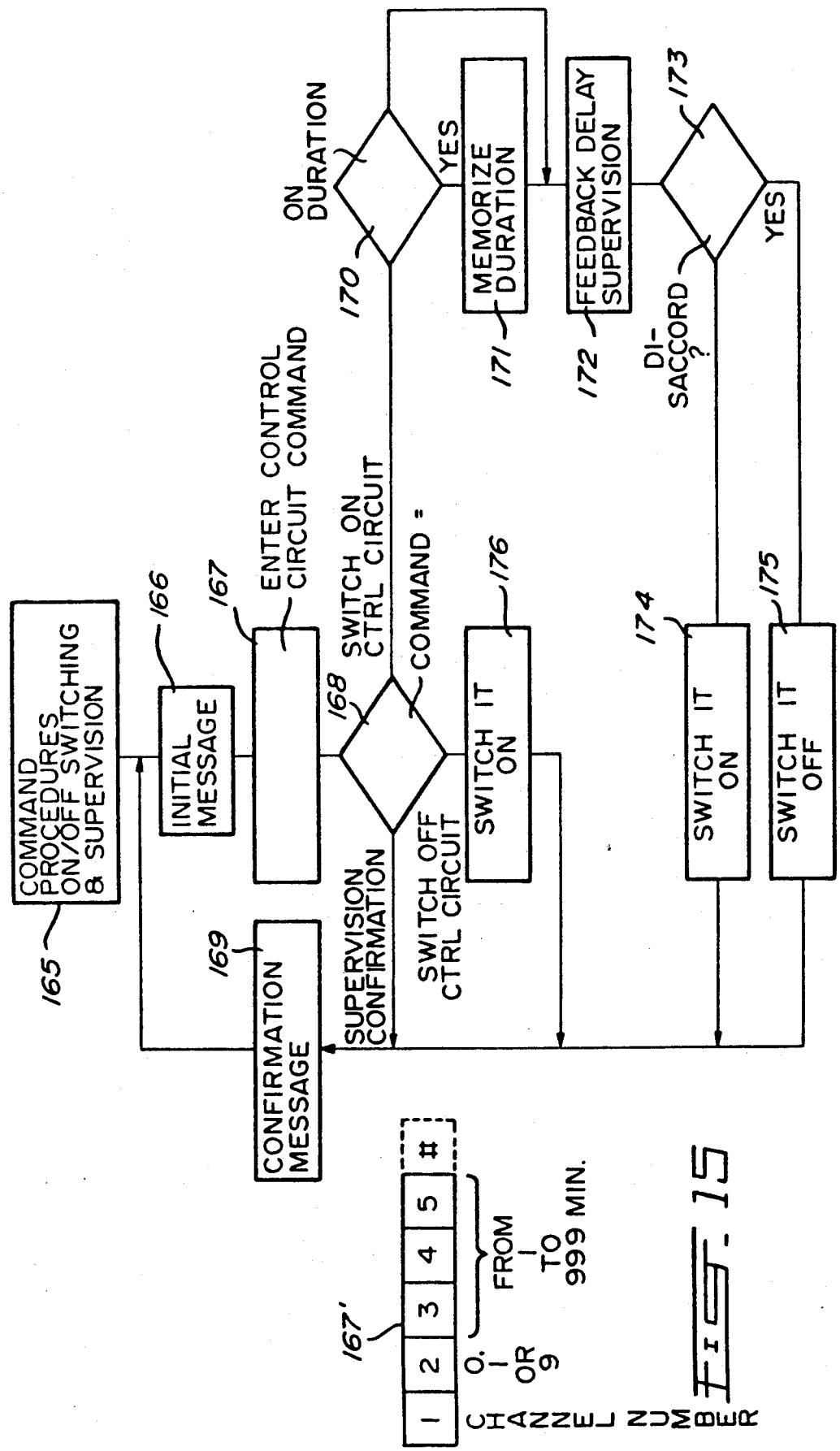
FIG. 15 is a flow chart showing the remote control and supervision of the ON/OFF switching sub-system.

Referring to FIG. 13, there is shown the stay-on-line algorithm 154. It is valid for any procedure, programming procedure, audio command procedure, on/off switching command procedure, or analog control command procedures. As shown in FIG. 9, a command procedure 101 is provided for the on/off switching of the sub-system. With further reference to FIG. 15, it can be seen that after a user has accessed the system, via the personal access code, if selection is the on/off switching command and supervision 165, the initial message 166 will say to the user: "Enter the control commands for a particular channel to be switched off, switched on or a command to receive a message confirmation of the actual status of the load". The one word command 167' is a series of few DTMF touch tone entries. The first entry should be the channel number to choose, the second entry is 0 for turning off, a 1 to turn on, or a 9 to ask for a confirmation. If 0 or 9 was chosen the system will execute the command, if a 1 is chosen as a second digit, the system will wait for up to 3 other digits which have their own duration time in minutes to keep the load on after the command entry. When a 1 was chosen as a second digit, the last touch to enter should be the number (#) on the telephone keypad, for example, we want to turn on load No. 2 for 999 minutes, we should enter 21999 followed by the touch tone number (#). In a second example, if we want to turn on load No. 1 indefinitely, we should enter 11 followed by the number on the keypad, and if we want to turn off load No. 1, we should enter 10, the number (#) is not needed in this case. If we want to confirm the status of the load No. 1 of channel 1, we should enter 19, and the system will execute by sending a confirmation message in this case, and the number (#) on the keypad is not needed. If the second digit is a 1 and the number (#) on the keypad is not entered, then the system will refuse to execute any command because it is not completed. If the duration function 170 was entered, the system will memorize the duration in 171. And, after executing the command, the system will wait until the feedback delay of the supervision is last, 172. Please see reference numeral 114 in FIG. 10B. Also, see FIG. 10E, reference numeral 266. Now suppose we ask a command that is to switch on a heater for 99 minutes, the thermostat 269 for monitoring supervision will take up to six minutes to close because of the temperature thermal constant of the water to be heated. When programming the unit for channel 1, (see 114 of FIG. 10B), the proper number entered for this application is 25% greater than the thermal constant of the hot water, to close the thermostat 269. Function 172 will eliminate the event of a disaccord. The user who turned on the load in question does not have to stay on the line to wait for the feedback delay supervision. He can hang up and phone later after the delay is last to ask for a confirmation message to be sure that the system responded with the thermal constant delay. Even if the user does not call back, if the system after the delay encountered is a disaccord, the system itself will auto-dial after this delay is last to say to the user that the feedback was not correct after the delay of the supervision. This is why it is important to be accurate in setting of 114 when programming the unit for these particular applications.

Referring to FIG. 2, circuit blocks 31, 31', L 32, 32, 35, 36, 35' and 36' denote the inputs and outputs of this sub-system. Details of these blocks are shown in FIG. 16. The opto-coupler 179 permits the interface of the exterior supervision circuit with the microcontroller 180. When a 1 is entered at input 1, it is necessary for a voltage of a DC or AC current at a specific frequency to be present for the microcontroller to recognize that the supervision is present. This signal which is applied to this input is a signal whereby the decision of the microcontroller is binary on or off, that is to say, whether there is supervision or not. Therefore, it does not consist of an analog signal. Even if the level of this signal may be 12 volts DC or 24 volts DC, or simply signals for 12 or 24 volts AC at an industrial frequency, as illustrated by reference numerals 184, 185 and 186 in FIG. 17.

Referring again to FIG. 10E, the terminal blocks 254, 264, 270 and 275 are those found in FIG. 16, input 1. For example, as terminal block 270 receives supervision feedback, such as the closing of thermostat 269, a voltage of 24 volts AC will be present at the block 270 signifying that the supervision is ON. If the thermostat 269 is open, the potential at terminal block 270 is 0 volts, therefore, the supervision is OFF and resistor 177 serves to limit the current flowing into diodes 178 and 179. Diode 179 is a light emitting diode of an opto-coupler. Diode 178 is used to impede the unwanted part of the sinusoidal input which may damage the light emitting diode 179. The signals at input 177 may also be a DC as well as an AC of industrial frequency. The processor, via the algorithm shown in FIG. 18 will accept the AC signals as a validation that the supervision is ON. "TEST IF INPUT STATE OF A CHANNEL STAYS LOW FOR MORE THAN 100 MILLISECONDS, IF TRUE CONSIDER THE SUPERVISION FEEDBACK OFF, IF NOT TRUE CONSIDER IT ON". This statement permits the validation of the AC signals at the input of the supervision has a starting frequency of 10 Hertz up to frequencies higher than 60 Hertz. If the AC signal at the input 177 is at low voltage, less than 24 volts, the waves are saturated at the exit of the opto-coupled transistor 179 and represented by square waves 186. The OFF periods of these square waves should not last more than 100 milliseconds as in the worst case shown in 186 it is less than 100 milliseconds as the completed period of the square waves has a frequency of 10 Hertz and 100 milliseconds. The OFF period should be less than 100 milliseconds. If the signal at input 177 is 12 or 24 volts DC, the problem does not exist. This analysis method for AC signals eliminates the need for filters consisting of capacitors and diodes, thereby eliminating the need of a more complex and populated circuit from a material (hardware) point of view. This method, as illustrated in FIG. 16 is achieved by a resistor, a diode and an opto-coupler. The light emitting diode 183 is the visual indicator described in FIG. 2, reference 35. Resistor 182 services to limit the current in this diode as it illuminates. This diode, from a functional viewpoint, indicates the accord or disaccord of the output status of the contact for channel 1 and the supervision status of the correspondent input. Push button 181, also shown in FIG. 2 as reference 36, is used to locally activate or deactivate output number 1, even if the operation could have been done by telephone.

Figure 19:
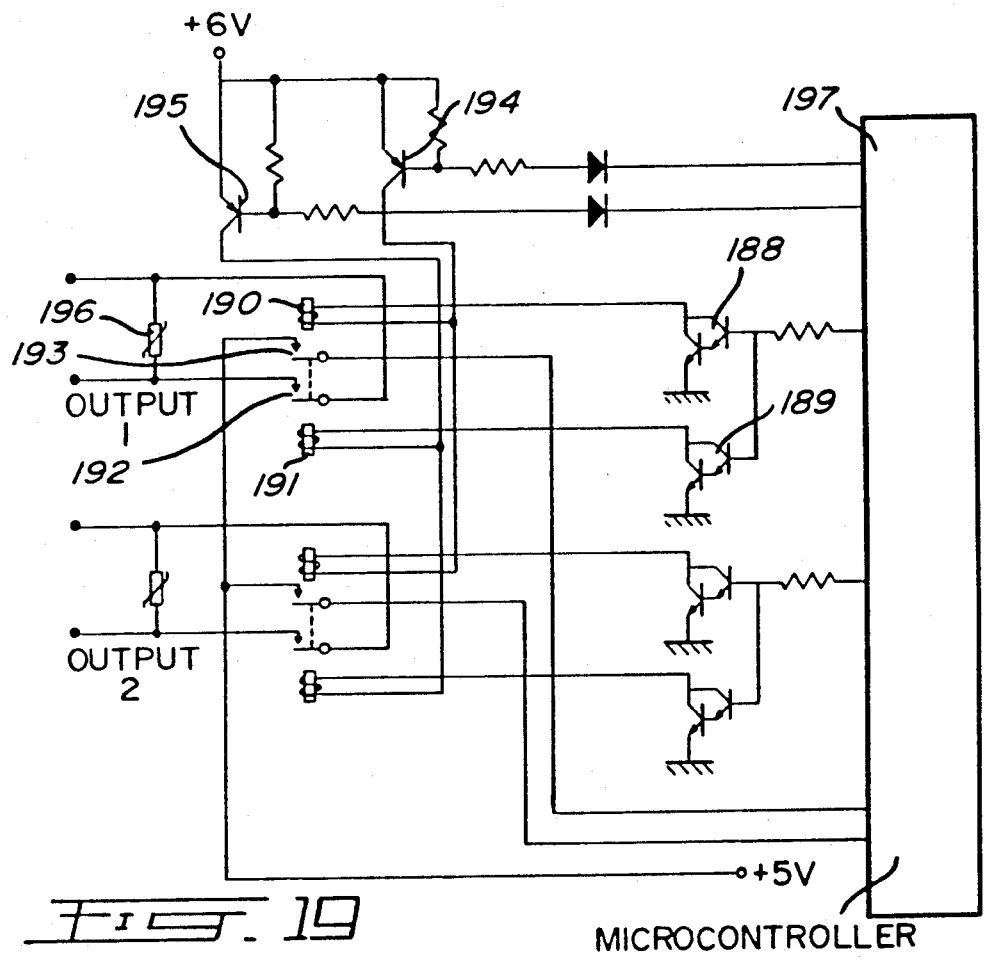
FIG. 19 is a schematic diagram showing the output relay drivers controlled by the microcontroller for the ON/OFF switching sub-system.

In FIG. 19, there is shown a latching relay having a double coil 190 and 191 and contacts 193 and 192, respectively. When a pulse is sent to coil 190, the two contacts 192 and 193 close. Whereas if a pulse is sent to coil 191, these two contacts will open and remain in one or another state even in the case of no power. Contact 192 is the output contact of channel 1. The other contact 193 is used to send information to the microcontroller in order to know what position the output contact is in. This internal supervision, via contact 193, is sampled at intervals of every tenth of a second by the system in order to know if the contacts have changed position for any reason, say a mechanical shock, without the authorization or command of the microcontroller. Varistor 196 is used to protect the circuit from power surges caused by the opening of contact 192 in the case that this is in series with a circuit of external inductive coils. In addition to this, the protection 196 increases the life of contact 192, transistors 188 and 189 as well as 194 and 193, and serves to drive the action of connecting and disconnecting coil No. 1 or No. 2 from the latching relay.

Figure 20:
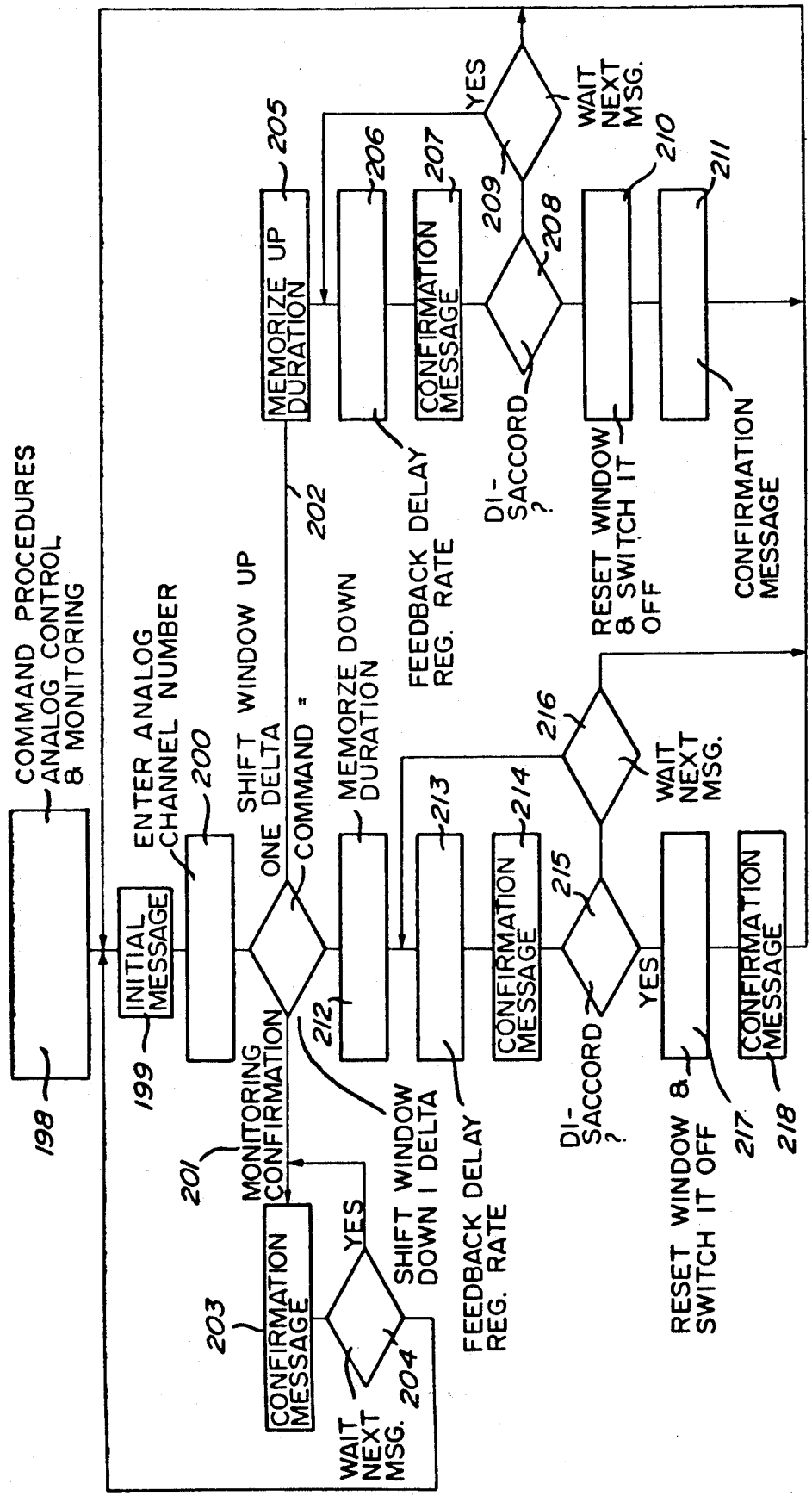
FIG. 20 is a flow chart showing the remote monitoring and temporary shifting of the reference window for regulation of the analog control and monitoring sub-system.

Referring now to FIG. 20, if after accessing the unit the user needs to proceed to the analog control monitoring command sub-system, then after selecting that sub-system, an initial message 199 will ask the user to enter the proper commands to choose the channel to ask for a monitoring confirmation to shift the window up one delta or to shift it down one delta. Here reference should also be made to FIG. 10C which illustrates at 119 to 128' the programming configuration set-up option programmed before the start-up of the system. The algorithm illustrated in FIG. 20 is similar to the algorithm of the on/off switching supervision sub-system of FIG. 15. As in 167', the entry word to command for a monitoring confirmation or to shift up and down are also similar to the on/off switching supervision commands. For example, the first digit of the command words should be the channel number, the second digit should be 0, 1 or 9. No. 0 is to reset the window to the original center window reference 123, if 9 is chosen as a second digit in the command word, the system will confirm by a synthesized voice the instantaneous value of the analog input of the channel in question. If No. 1 is chosen as a second digit, the system will shift down the reference window for one delta. If 2 is chosen as the second digit in the command word, the system will shift up the reference window for one delta. Please note: in case of entering 1 or 2 as the second digit, the user must enter an ON duration delay after which the system will automatically reset the center window to the preset value in the programming option 123. When 1 or 2 is used as the second digit in the command word, the user should terminate this command by pressing the (#) button on the telephone keypad as we already described with reference to 167'.

After the command is entered in the system, the system will memorize the up duration (see 205) in minutes and the system also at 206 will wait for an analog feedback delay regulation rate as shown at 127. A confirmation message will follow in circuit 207. If the new value of the analog input is included in the new shifting of the new reference window, the system will wait at 209 for the next sampling followed by a new confirmation message which has to be a value that is included in the reference window. If there is disaccord at 208, which means that the analog input signal did not reach the new value of the reference window, the system will reset the window according to the option setting at 123 and if programmed with a 1, see 126 at FIG. 10C, the system will also switch off the correspondent channel in the on/off switching sub-system. A confirmation message at 211 will follow. The user stays on the line as the same algorithm 198 could shift the window up or down a few times to increment the shifting not only by 1 but several times without having to hang up and to dial again. Functions 212 to 218 have the same operation as 205 to 211. Function 201 refers to 167' and if the second digit entered is a 9, then it refers to 203 and 204. The user stays on the line and listens for many minutes for the feedback confirmation of the instantaneous value of the analog input of the channel in question. Each message will be repeated with the sampling rate as programmed in 127 (see FIG. 10C and FIG. 13). In case the user stays on the line more than the time allowed by the stay-on line algorithm, a time-off warning beep 155 will ask him to touch any touch tone telephone number except the star (*) to reset the on-line timer and to stay on the line waiting for the next message. Please refer to FIG. 23, wherein the auto-dialing and system monitoring procedure 230 is illustrated. This algorithm takes effect only if the system is not in the communication mode, that is to say, if a user is commanding the unit by telephone, this algorithm is not in effect but will be in effect only after the system is hung up. The interruption request 231 is the trigger to auto-dial. As shown in FIGS. 10B and 10C, options 115, 118' and 128' are configuration settings to allow the three sub-systems to enable or disable the auto-dialing feature which could trigger the auto-dialing procedure for the switch on and off sub-system. As shown in FIG. 10E, if elements 253, 262 263 or 269 or 274 opens, for any reason, and one command is activated, this will trigger the auto-dialer. In the analog control and monitoring sub-system of FIG. 21, if analog input 219 reading is out of the window 124 and 123 for more than the delay of the sampling rate 127, this will cause a triggering of the auto-dialer for the audio sub-system. Function 118' enables microphones by analyzing the sounds in the room and comparing them to a pattern. The system can recognize the difference between human voices and other noises or a specific noise recognized which may trigger the auto-dialing system. For example, an infrared motion detector, that is not part of the present invention or other similar pick-up elements that are used in security systems, could trigger the auto-dialer by permitting the user in another place to listen at which is happening in the place where the microphones are installed.

As shown in FIG. 23, the system 232 will set to N the round counter, N being the number of times the system has to dial as programmed in the configuration option 110'. If the auto-dialing system can reach both persons at the two phone numbers programmed in 109 and 110, the system will not telephone more than once. If the auto-dialing system cannot reach one or both of the phone numbers, it will try again for N times minus one within an interval time in minutes as shown in FIG. 10A, in 110". If after N calls the system will not reach or cannot reach both of the two telephone numbers, the light emitting diode 60 in FIG. 3 will blink. The blinking of the light emitting diode 60 will provide proof that the system tried to call out of the premises because of interruption and nobody was reached. Reset of this light emitting diode could be done by activating the push button 47 on and off, see FIG. 3. Functions 239 to 245 illustrates the procedures to dial the first phone number and the selection if the communication is to a modem or a human (see 242, 243 and 244). The second part of the algorithm for the second phone number is similar to the first one. Function 247 relates to the documentation of the round counter each time the system dials again. The delay 237 illustrates the interval between one call and another call. In the dialing loop, the "OR" logic or test 233 will test if both telephone numbers are reached. If yes, the system will hang up and the light emitting diode 60 in FIG. 3 will not blink. The logic "N" test function 236 is the decrementation of the ring counter and is equal to 0. The function 235 and the test 236 will cause a hang-up and let the light emitting diode 60 flash. This is only if both of the telephone numbers could not be reached. If one is reached, the light emitting diode will not blink. Depending on the importance of the interruption request, the user could set up the good number of calling time and the interval between these calling times to be sure that at least one of the two phone numbers can be reached and all this according to the laws of the telecommunication commission.

I claim:

1. A stand-alone switching system for remotely controlling electrically operated devices or monitoring locations by the use of DTMF code signals generated by a telephone keypad, said system comprising a telephone line input for connection to a telephone network, an input interface circuit connected to said input and having an auto-dialer circuit, a communication circuit connected between said interface circuit and a microcontroller; said microcontroller being connected to a switching sub-system for switching said electrically operated devices and/or an analog control and monitoring sub-system, all of which perform predetermined functions implemented by said user through said telephone keypad by using a programming or command access algorithm through a series of option codes punched on said keypad, said communication circuit operating in a DTMF or modulated signals depending on the source of said input signal codes, said input interface circuit having a digitally filtered ring detector for discriminating between true telephone rings and undesirable pulse signals, and a switching device when in a first position connects a telephone ring detector to said telephone line to receive said true telephone rings and to connect them to said microcontroller, said microcontroller causing said switching device to assume a second switch position after said ring detector has received a predetermined number of rings, feedback signals being connected through said second switch position to feed back information to said user, a speech circuit connected to an output of said second position of said switching device, a modem circuit connected between said speech circuit and said microcontroller for two-way communication through modulated signals or a DTMF decoder circuit connected between said microcontroller and said speech circuit for receiving and decoding DTMF function code signals as well as frequency from said speech circuit to feed said microcontroller to execute output or programming commands or to monitor the status of said electrically operated devices, said switching sub-system having a plurality of input and output channels, said output channels being equipped with switches to switch said electrically operated devices, said input channels being connected to feedback signalling elements to verify the operation and to monitor said electrically operated devices which have been switched, said analog control and monitoring sub-system having a plurality of input and output channels, said input channels being monitoring channels and receiving analog signals from a remote industrial device and converting same to a digital signal, said output channels feeding regulating signals to industrial actuator devices to be controlled.

2. A switching system as claimed in claim 1 wherein said switching device is a switching relay circuit.

3. A switching system as claimed in claim 1 wherein an audio circuit for monitoring an environment is further connected to said speech circuit, said audio circuit being connected for two-way audio communication with said speech circuit, said audio circuit having a speaker output and a microphone input to permit sound communication between a remote location and said user.

4. A switching system as claimed in claim 3 wherein said audio sub-system is programmed to enable said two-way audio communication, or to disable said speaker output only, or to disable said microphone only or to disable completely said two-way audio communication.

5. A switching system as claimed in claim 1 wherein a speech synthesizer circuit is connected between said microcontroller and said speed circuit for transmitting pre-programmed voice messages to said user.

6. A switching system as claimed in claim 5 wherein said speech synthesizer circuit is an integrated circuit having a ROM memory in which are words and phrase data which is sent to said microcontroller according to address codes sent by said microcontroller, said microcontroller transmitting to a speech synthesizer wherein a vocal signal is transmitted through a filter to said speech circuit to produce messages to be communicated to said user.

7. A switching system as claimed in claim 1 wherein a DTMF dialer circuit is connected between said microcontroller and said speech circuit for transmitting DTMF or code signals to dial recorded telephone numbers for automatic message transmission.

8. A switching system as claimed in claim 7 wherein said auto-dialer is programmed to enable or disable said auto dialing functions.

9. A switching system as claimed in claim 1 wherein a call progress circuit is connected between said microcontroller and said speech circuit for monitoring sounds from said telephone line input to instruct said microcontroller by a binary code is there is no communication established from an automatically dialed telephone number after a predetermined number of rings.

10. A switching system as claimed in claim 1 wherein said microcontroller is provided with an electrically erasable and programmable read only memory (EEPROM) which is programmed by the user by telephone using DTMF code signals, and an external read only memory for the storage of data for a speech synthesizer circuit.

11. A switching system as claimed in claim 10 wherein a plurality of option codes are stored in said EEPROM, said codes being changeable by said user, one of said codes being a personal access code to allow access to a command mode of said EEPROM, a programming master code to provide access to codes in the EEPROM, a device identification transmission code to identify a malfunction of a monitored device and ring number code to determine the number of rings after which the device will pick up the telephone line and programmed to permit two devices to be connected on said same line.

12. A switching system as claimed in claim 11 wherein said switching sub-system includes an application mode option code, an output contact position code, an auto-off and emergency-off code which permit said system to instantaneously and permanently disconnected a load if a monitoring circuit detects stoppage and/or malfunctioning of said load.

13. A switching system as claimed in claims 1 of 12 wherein said output contacts of said switching sub-system are programmed via the application mode setting to be:
  i) continuous action contacts wherein each said contacts monopolize one channel,
  ii) momentary action pair of said contacts wherein each pair of contacts monopolize two channels, or
  iii) a momentary action simple contact which monopolize one channel.

14. A switching system as claimed in claim 1 wherein said microcontroller comprises a time clock to pre-program functions of devices associated with said switching sub-system and analog control and monitoring sub-system, said time clock being controlled by said telephone keypad.

15. A switching system as claimed in claims 14 or 11 wherein said switching sub-system includes a time clock setting, and an automatic switching ON/OFF setting for said time clock.

16. A switching system as claimed in claim 1 wherein said switching device is a ring detector circuit having a double pole double throw relay which when in said first position connects said telephone line input to a resistor-capacitor network to compose an input to a ring detector, a resistor limits the current of said telephone signal through two parallel inversely connected diodes, a capacitor between said resistor and diodes to block the DC component of said telephone signal and letting a 20 Hz AC signal component through, one of said diodes removing the negative half-wave of said AC component, the other of said diodes being a light emitting diode which illuminates when said 20 Hz AC signal component is present and actuates an opto-coupled transistor to feed said microcontroller.

17. A switching system as claimed in claim 16 wherein said switching device further comprises a transistor which energizes the coil of said switching relay when receiving a validation signal from said microcontroller to switch to said second position and disconnecting said ring detector circuit.

18. A switching system as claimed in claim 1 wherein said analog control and monitoring sub-system includes programming settings which are stored in said EEPROM, said setting including the following programming functions:

a) the type of read unit setting,
b) the name of the unit,
c) the bottom scale magnitude setting,
d) the top scale,
e) the centre window reference for regulation setting,
f) the output window delta regulation setting,
g) the decimal scale divider setting,
h) the setting to enable or disable the analog control and monitoring dependability and inter-relation with the AUTO-OFF supervision function in the switching sub-system,
i) the setting for the Read and Speach and Regulation sampling rate,
j) the setting to allow shifting of the reference windo, VP or DOWN.

* * * * *